(12) United States Patent
Breslin et al.

(10) Patent No.: US 10,535,281 B2
(45) Date of Patent: Jan. 14, 2020

(54) SURGICAL TRAINING MODEL FOR LAPAROSCOPIC PROCEDURES

(71) Applicant: Applied Medical Resources Corporation, Rancho Santa Margarita, CA (US)

(72) Inventors: Tracy Breslin, Rancho Santa Margarita, CA (US); Charles C. Hart, Rancho Santa Margarita, CA (US); Serene Wachli, Rancho Santa Margarita, CA (US); Adam Hoke, Shelbyville, MI (US); Nikolai Poulsen, Rancho Santa Margarita, CA (US); Michael Palermo, Trabuco Canyon, CA (US); Lee Cohen, Rancho Santa Margarita, CA (US); Jacqueline DeMarchi, Rancho Santa Margarita, CA (US); Amy Garces, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 268 days.

(21) Appl. No.: 14/036,168

(22) Filed: Sep. 25, 2013

(65) Prior Publication Data
US 2014/0087346 A1 Mar. 27, 2014

Related U.S. Application Data

(60) Provisional application No. 61/705,972, filed on Sep. 26, 2012.

(51) Int. Cl.
*G09B 23/28* (2006.01)
*G09B 23/30* (2006.01)

(52) U.S. Cl.
CPC ........... *G09B 23/285* (2013.01); *G09B 23/30* (2013.01)

(58) Field of Classification Search
CPC .................................................... G09B 23/285
See application file for complete search history.

(56) References Cited

U.S. PATENT DOCUMENTS

| 184,573 A | 11/1876 | Becker |
| 2,127,774 A | 8/1938 | Jacobson |
| (Continued) | | |

FOREIGN PATENT DOCUMENTS

| CN | 2421706 Y | 2/2001 |
| CN | 2751372 Y | 1/2006 |
| (Continued) | | |

OTHER PUBLICATIONS

European Patent Office, The International Search Report and Written Opinion for International Application No. PCT/US2012/070971, dated Jul. 4, 2014, entitled "Advanced Surgical Simulation Constructions and Methods".

(Continued)

*Primary Examiner* — Eddy Saint-Vil
*Assistant Examiner* — William D Ermlick
(74) *Attorney, Agent, or Firm* — Patrick Ikehara; Thomas Nguyen

(57) ABSTRACT

A surgical training model that includes a simulated tissue having a tubular shape that is connected to a tissue holder is provided. A portion of the simulated tissue overhangs the distal end of the tissue holder to simulate a cuff-like entry to the vaginal vault or resected intestine suitable for practicing laparoscopic closure of the vaginal vault, intestine or other organ via suturing or stapling. Two concentric tubular structures are also arranged over the same tissue holder. A second model includes two portions of simulated tissue that are held (Continued)

by two holders such that the simulated tissues are adjacent making the model suitable for practicing different types of anastomosis procedures. A third model includes two holders with a single or double tubular simulated tissue structure connected to and spanning a gap between the holders. The model isolates the step of closing a cylindrical opening for the purpose of repeated practice.

10 Claims, 6 Drawing Sheets

(56) References Cited

U.S. PATENT DOCUMENTS

| | | | |
|---|---|---|---|
| 2,284,888 A | 6/1942 | Arneill, Jr. | |
| 2,324,702 A | 7/1943 | Hoffman et al. | |
| 2,345,489 A | 3/1944 | Lord | |
| 2,495,568 A | 1/1950 | Coel | |
| 3,766,666 A | 10/1973 | Stroop | |
| 3,775,865 A * | 12/1973 | Rowan | G09B 23/28 434/262 |
| 3,789,518 A | 2/1974 | Chase | |
| 3,921,311 A | 11/1975 | Beasley et al. | |
| 3,991,490 A | 11/1976 | Markman | |
| 4,001,951 A | 1/1977 | Fasse | |
| 4,001,952 A | 1/1977 | Kleppinger | |
| 4,321,047 A | 3/1982 | Landis | |
| 4,323,350 A | 4/1982 | Bowden, Jr. | |
| 4,332,569 A | 6/1982 | Burbank | |
| 4,371,345 A * | 2/1983 | Palmer | G02B 27/2278 428/13 |
| 4,386,917 A | 6/1983 | Forrest | |
| 4,459,113 A | 7/1984 | Boscaro Gatti et al. | |
| 4,481,001 A | 11/1984 | Graham et al. | |
| 4,596,528 A | 6/1986 | Lewis et al. | |
| 4,726,772 A | 2/1988 | Amplatz | |
| 4,737,109 A | 4/1988 | Abramson | |
| 4,789,340 A * | 12/1988 | Zikria | G09B 23/28 434/262 |
| 4,832,978 A | 5/1989 | Lesser | |
| 4,867,686 A | 9/1989 | Goldstein | |
| 4,907,973 A | 3/1990 | Hon | |
| 4,938,696 A | 7/1990 | Foster et al. | |
| 4,940,412 A | 7/1990 | Blumenthal | |
| 5,061,187 A | 10/1991 | Jerath | |
| 5,083,962 A | 1/1992 | Pracas | |
| 5,104,328 A | 4/1992 | Lounsbury | |
| 5,149,270 A | 9/1992 | McKeown | |
| 5,180,308 A | 1/1993 | Garito et al. | |
| 5,230,630 A | 7/1993 | Burgett | |
| 5,273,435 A | 12/1993 | Jacobson | |
| 5,295,694 A | 3/1994 | Levin | |
| 5,310,348 A | 5/1994 | Miller | |
| 5,318,448 A | 6/1994 | Garito et al. | |
| 5,320,537 A * | 6/1994 | Watson | G09B 23/28 434/272 |
| 5,358,408 A | 10/1994 | Medina | |
| 5,368,487 A | 11/1994 | Medina | |
| 5,380,207 A | 1/1995 | Siepser | |
| 5,403,191 A | 4/1995 | Tuason | |
| 5,425,644 A | 6/1995 | Szinicz | |
| 5,425,731 A | 6/1995 | Daniel et al. | |
| 5,472,345 A | 12/1995 | Eggert | |
| 5,518,406 A | 5/1996 | Waters | |
| 5,518,407 A | 5/1996 | Greenfield et al. | |
| 5,520,633 A | 5/1996 | Costin | |
| 5,541,304 A | 7/1996 | Thompson | |
| 5,620,326 A | 4/1997 | Younker | |
| 5,720,742 A | 2/1998 | Zacharias | |
| 5,722,836 A | 3/1998 | Younker | |
| 5,727,948 A | 3/1998 | Jordan | |
| 5,743,730 A | 4/1998 | Clester et al. | |
| 5,762,458 A | 6/1998 | Wang et al. | |
| 5,769,640 A | 6/1998 | Jacobus et al. | |
| 5,775,916 A * | 7/1998 | Cooper | G09B 23/285 434/267 |
| 5,785,531 A | 7/1998 | Leung et al. | |
| 5,800,178 A | 9/1998 | Gillio | |
| 5,803,746 A | 9/1998 | Barrie et al. | |
| 5,807,378 A | 9/1998 | Jensen et al. | |
| 5,810,880 A | 9/1998 | Jensen et al. | |
| 5,814,038 A | 9/1998 | Jensen et al. | |
| 5,850,033 A | 12/1998 | Mirzeabasov et al. | |
| 5,855,583 A | 1/1999 | Wang et al. | |
| 5,873,732 A * | 2/1999 | Hasson | G09B 23/286 434/262 |
| 5,873,863 A | 2/1999 | Komlosi | |
| 5,908,302 A | 6/1999 | Goldfarb | |
| 5,947,743 A | 9/1999 | Hasson | |
| 5,951,301 A | 9/1999 | Younker | |
| 6,080,181 A | 6/2000 | Jensen et al. | |
| 6,083,008 A | 7/2000 | Yamada et al. | |
| 6,113,395 A | 9/2000 | Hon | |
| 6,234,804 B1 | 5/2001 | Yong | |
| 6,336,812 B1 | 1/2002 | Cooper et al. | |
| 6,398,557 B1 | 6/2002 | Hoballah | |
| 6,413,264 B1 | 7/2002 | Jensen et al. | |
| 6,474,993 B1 | 11/2002 | Grund et al. | |
| 6,485,308 B1 | 11/2002 | Goldstein | |
| 6,488,507 B1 | 12/2002 | Stoloff et al. | |
| 6,497,902 B1 | 12/2002 | Ma | |
| 6,511,325 B1 | 1/2003 | Lalka et al. | |
| 6,517,354 B1 | 2/2003 | Levy | |
| 6,568,941 B1 | 5/2003 | Goldstein | |
| 6,620,174 B2 | 9/2003 | Jensen et al. | |
| 6,654,000 B2 | 11/2003 | Rosenberg | |
| 6,659,776 B1 | 12/2003 | Aumann et al. | |
| 6,773,263 B2 | 8/2004 | Nicholls et al. | |
| 6,780,016 B1 | 8/2004 | Toly | |
| 6,817,973 B2 | 11/2004 | Merril et al. | |
| 6,820,025 B2 | 11/2004 | Bachmann et al. | |
| 6,854,976 B1 | 2/2005 | Suhr | |
| 6,857,878 B1 | 2/2005 | Chosack et al. | |
| 6,863,536 B1 | 3/2005 | Fisher et al. | |
| 6,866,514 B2 | 3/2005 | Von Roeschlaub et al. | |
| 6,887,082 B2 | 5/2005 | Shun | |
| 6,929,481 B1 | 8/2005 | Alexander et al. | |
| 6,939,138 B2 | 9/2005 | Chosack et al. | |
| 6,950,025 B1 | 9/2005 | Nguyen | |
| 6,960,617 B2 | 11/2005 | Omidian et al. | |
| 6,997,719 B2 | 2/2006 | Wellman et al. | |
| 7,008,232 B2 | 3/2006 | Brassel | |
| 7,018,327 B1 | 3/2006 | Conti | |
| 7,025,064 B2 | 4/2006 | Wang et al. | |
| 7,056,123 B2 | 6/2006 | Gregorio et al. | |
| 7,080,984 B1 | 7/2006 | Cohen | |
| 7,118,582 B1 | 10/2006 | Wang et al. | |
| 7,255,565 B2 | 8/2007 | Keegan | |
| 7,269,532 B2 | 9/2007 | David et al. | |
| 7,272,766 B2 | 9/2007 | Sakezles | |
| 7,300,450 B2 | 11/2007 | Vleugels et al. | |
| 7,364,582 B2 | 4/2008 | Lee | |
| 7,404,716 B2 | 7/2008 | Gregorio et al. | |
| 7,419,376 B2 | 9/2008 | Sarvazyan et al. | |
| 7,427,199 B2 | 9/2008 | Sakezles | |
| 7,431,189 B2 | 10/2008 | Shelton, IV et al. | |
| 7,441,684 B2 | 10/2008 | Shelton, IV et al. | |
| 7,465,168 B2 | 12/2008 | Allen et al. | |
| 7,467,075 B2 | 12/2008 | Humphries et al. | |
| 7,544,062 B1 | 6/2009 | Hauschild et al. | |
| 7,549,866 B2 | 6/2009 | Cohen et al. | |
| 7,553,159 B1 | 6/2009 | Arnal et al. | |
| 7,575,434 B2 | 8/2009 | Palakodeti | |
| 7,594,815 B2 | 9/2009 | Toly | |
| 7,621,749 B2 | 11/2009 | Munday | |
| 7,646,901 B2 | 1/2010 | Murphy et al. | |
| 7,648,367 B1 | 1/2010 | Makower et al. | |
| 7,648,513 B2 | 1/2010 | Green et al. | |
| 7,651,332 B2 | 1/2010 | Dupuis et al. | |
| 7,677,897 B2 | 3/2010 | Sakezles | |
| 7,775,916 B1 | 8/2010 | Mahoney | |
| 7,780,451 B2 | 8/2010 | Willobee et al. | |
| 7,802,990 B2 | 9/2010 | Korndorffer et al. | |

(56) References Cited

U.S. PATENT DOCUMENTS

| | | |
|---|---|---|
| 7,803,151 B2 | 9/2010 | Whitman |
| 7,806,696 B2 | 10/2010 | Alexander et al. |
| 7,819,799 B2 | 10/2010 | Merril et al. |
| 7,833,018 B2 | 11/2010 | Alexander et al. |
| 7,837,473 B2 | 11/2010 | Koh |
| 7,850,454 B2 | 12/2010 | Toly |
| 7,850,456 B2 | 12/2010 | Chosack et al. |
| 7,854,612 B2 | 12/2010 | Frassica et al. |
| 7,857,626 B2 | 12/2010 | Toly |
| 7,866,983 B2 | 1/2011 | Hemphill et al. |
| 7,931,470 B2 | 4/2011 | Alexander et al. |
| 7,931,471 B2 | 4/2011 | Senagore et al. |
| 7,988,992 B2 | 8/2011 | Omidian et al. |
| 7,993,140 B2 | 8/2011 | Sakezles |
| 7,997,903 B2 | 8/2011 | Hasson et al. |
| 8,007,281 B2 | 8/2011 | Toly |
| 8,007,282 B2 | 8/2011 | Gregorio et al. |
| 8,016,818 B2 | 9/2011 | Ellis et al. |
| 8,021,162 B2 | 9/2011 | Sui |
| 8,048,088 B2 | 11/2011 | Green et al. |
| 8,083,691 B2 | 12/2011 | Goldenberg et al. |
| 8,116,847 B2 | 2/2012 | Gattani et al. |
| 8,137,110 B2 | 3/2012 | Sakezles |
| 8,157,145 B2 | 4/2012 | Shelton, IV et al. |
| 8,197,464 B2 | 6/2012 | Krever et al. |
| 8,205,779 B2 | 6/2012 | Ma et al. |
| 8,221,129 B2 | 7/2012 | Parry et al. |
| 8,297,982 B2 | 10/2012 | Park et al. |
| 8,308,817 B2 | 11/2012 | Egilsson et al. |
| 8,323,028 B2 | 12/2012 | Matanhelia |
| 8,323,029 B2 | 12/2012 | Toly |
| 8,328,560 B2 | 12/2012 | Niblock et al. |
| 8,342,851 B1 | 1/2013 | Speeg et al. |
| 8,403,674 B2 | 3/2013 | Feygin et al. |
| 8,403,675 B2 | 3/2013 | Stoianovici et al. |
| 8,403,676 B2 | 3/2013 | Frassica et al. |
| 8,408,920 B2 | 4/2013 | Speller |
| 8,425,234 B2 | 4/2013 | Sakezles |
| 8,439,687 B1 | 5/2013 | Morriss et al. |
| 8,442,621 B2 | 5/2013 | Gorek et al. |
| 8,454,368 B2 | 6/2013 | Ault et al. |
| 8,459,094 B2 | 6/2013 | Yanni |
| 8,459,520 B2 | 6/2013 | Giordano et al. |
| 8,460,002 B2 | 6/2013 | Wang et al. |
| 8,469,715 B2 | 6/2013 | Ambrozio |
| 8,469,716 B2 | 6/2013 | Fedotov et al. |
| 8,480,407 B2 | 7/2013 | Campbell et al. |
| 8,480,408 B2 | 7/2013 | Ishii et al. |
| 8,491,309 B2 | 7/2013 | Parry et al. |
| 8,500,753 B2 | 8/2013 | Green et al. |
| 8,512,044 B2 | 8/2013 | Sakezles |
| 8,517,243 B2 | 8/2013 | Giordano et al. |
| 8,521,252 B2 | 8/2013 | Diez |
| 8,535,062 B2 | 9/2013 | Nguyen |
| 8,544,711 B2 | 10/2013 | Ma et al. |
| 8,556,635 B2 | 10/2013 | Toly |
| 8,608,483 B2 | 12/2013 | Trotta et al. |
| 8,613,621 B2 | 12/2013 | Henderickson et al. |
| 8,636,520 B2 | 1/2014 | Iwasaki et al. |
| D699,297 S | 2/2014 | Bahsoun et al. |
| 8,641,423 B2 | 2/2014 | Gumkowski |
| 8,647,125 B2 | 2/2014 | Johns et al. |
| 8,678,831 B2 | 3/2014 | Trotta et al. |
| 8,679,279 B2 | 3/2014 | Thompson et al. |
| 8,696,363 B2 | 4/2014 | Gray et al. |
| 8,708,213 B2 | 4/2014 | Shelton, IV et al. |
| 8,708,707 B2 | 4/2014 | Hendrickson et al. |
| 8,764,449 B2 | 7/2014 | Rios et al. |
| 8,764,452 B2 | 7/2014 | Pravong et al. |
| 8,800,839 B2 | 8/2014 | Beetel |
| 8,801,437 B2 | 8/2014 | Mousques |
| 8,801,438 B2 | 8/2014 | Sakezles |
| 8,807,414 B2 | 8/2014 | Ross et al. |
| 8,808,004 B2 | 8/2014 | Misawa et al. |
| 8,808,311 B2 | 8/2014 | Heinrich et al. |
| 8,814,573 B2 | 8/2014 | Nguyen |
| 8,827,988 B2 | 9/2014 | Belson et al. |
| 8,840,628 B2 | 9/2014 | Green et al. |
| 8,870,576 B2 | 10/2014 | Millon et al. |
| 8,888,498 B2 | 11/2014 | Bisaillon et al. |
| 8,893,946 B2 | 11/2014 | Boudreaux et al. |
| 8,911,238 B2 | 12/2014 | Forsythe |
| 8,915,742 B2 | 12/2014 | Hendrickson et al. |
| 8,945,095 B2 | 2/2015 | Blumenkranz et al. |
| 8,961,190 B2 | 2/2015 | Hart et al. |
| 8,966,954 B2 | 3/2015 | Ni et al. |
| 8,968,003 B2 | 3/2015 | Hendrickson et al. |
| 9,008,989 B2 | 4/2015 | Wilson et al. |
| 9,017,080 B1 | 4/2015 | Placik |
| 9,026,247 B2 | 5/2015 | White |
| 9,050,201 B2 | 6/2015 | Egilsson et al. |
| 9,056,126 B2 | 6/2015 | Hersel et al. |
| 9,070,306 B2 | 6/2015 | Rappel et al. |
| 9,087,458 B2 | 7/2015 | Shim et al. |
| 9,117,377 B2 | 8/2015 | Shim et al. |
| 9,119,572 B2 | 9/2015 | Gorek et al. |
| 9,123,261 B2 | 9/2015 | Lowe |
| 9,129,054 B2 | 9/2015 | Nawana et al. |
| 9,196,176 B2 | 11/2015 | Hager et al. |
| 9,226,799 B2 | 1/2016 | Lightcap et al. |
| 9,257,055 B2 | 2/2016 | Endo et al. |
| 9,265,587 B2 | 2/2016 | Vancamberg et al. |
| 9,295,468 B2 | 3/2016 | Heinrich et al. |
| 9,351,714 B2 | 5/2016 | Ross et al. |
| 9,336,694 B2 | 6/2016 | Shim et al. |
| 9,358,682 B2 | 6/2016 | Ruiz Morales |
| 9,364,224 B2 | 6/2016 | Nicholas et al. |
| 9,364,279 B2 | 6/2016 | Houser et al. |
| 9,370,361 B2 | 6/2016 | Viola et al. |
| 9,373,270 B2 | 6/2016 | Miyazaki |
| 9,439,649 B2 | 9/2016 | Shelton, IV et al. |
| 9,439,733 B2 | 9/2016 | Ha et al. |
| 9,449,532 B2 | 9/2016 | Black et al. |
| 9,468,438 B2 | 10/2016 | Baber et al. |
| 10,140,889 B2 * | 11/2018 | Black ................ G09B 23/30 |
| 2001/0019818 A1 | 9/2001 | Yong |
| 2002/0168619 A1 | 11/2002 | Provenza |
| 2003/0031993 A1 | 2/2003 | Pugh |
| 2003/0091967 A1 | 5/2003 | Chosack et al. |
| 2003/0176770 A1 | 9/2003 | Merril et al. |
| 2004/0005423 A1 | 1/2004 | Dalton et al. |
| 2004/0126746 A1 | 7/2004 | Toly |
| 2004/0248072 A1 | 12/2004 | Gray et al. |
| 2005/0008997 A1 | 1/2005 | Herman |
| 2005/0026125 A1 | 2/2005 | Toly |
| 2005/0084833 A1 | 4/2005 | Lacey et al. |
| 2005/0131390 A1 | 6/2005 | Heinrich et al. |
| 2005/0142525 A1 * | 6/2005 | Cotin ................ G09B 23/285 |
| | | 434/262 |
| 2005/0192595 A1 | 9/2005 | Green et al. |
| 2005/0196739 A1 | 9/2005 | Moriyama |
| 2005/0196740 A1 | 9/2005 | Moriyana |
| 2005/0214727 A1 | 9/2005 | Stoianovici et al. |
| 2006/0046235 A1 | 2/2006 | Alexander et al. |
| 2006/0252019 A1 | 11/2006 | Burkitt et al. |
| 2006/0275741 A1 | 12/2006 | Chewning et al. |
| 2007/0074584 A1 | 4/2007 | Talarico et al. |
| 2007/0077544 A1 | 4/2007 | Lemperle et al. |
| 2007/0078484 A1 | 4/2007 | Talarico et al. |
| 2007/0148626 A1 | 6/2007 | Ikeda |
| 2007/0166682 A1 * | 7/2007 | Yarin ................ G09B 23/285 |
| | | 434/267 |
| 2007/0197895 A1 | 8/2007 | Nycz et al. |
| 2007/0225734 A1 | 9/2007 | Bell et al. |
| 2007/0275359 A1 | 11/2007 | Rotnes et al. |
| 2008/0032272 A1 | 2/2008 | Palakodeti |
| 2008/0032273 A1 | 2/2008 | Macnamara et al. |
| 2008/0052034 A1 | 2/2008 | David et al. |
| 2008/0064017 A1 | 3/2008 | Grundmeyer, III |
| 2008/0076101 A1 | 3/2008 | Hyde et al. |
| 2008/0097501 A1 | 4/2008 | Blier |
| 2008/0108869 A1 | 5/2008 | Sanders et al. |
| 2008/0187895 A1 * | 8/2008 | Sakezles ............. G09B 23/306 |
| | | 434/268 |

(56) References Cited

U.S. PATENT DOCUMENTS

| | | |
|---|---|---|
| 2008/0188948 A1 | 8/2008 | Flatt |
| 2008/0299529 A1* | 12/2008 | Schaller .............. G09B 23/285 |
| | | 434/267 |
| 2009/0246747 A1 | 1/2009 | Buckman, Jr. |
| 2009/0068627 A1 | 3/2009 | Toly |
| 2009/0142739 A1 | 6/2009 | Wang et al. |
| 2009/0142741 A1 | 6/2009 | Ault et al. |
| 2009/0143642 A1 | 6/2009 | Takahashi et al. |
| 2009/0176196 A1 | 7/2009 | Niblock et al. |
| 2009/0187079 A1 | 7/2009 | Albrecht et al. |
| 2009/0298034 A1 | 12/2009 | Parry et al. |
| 2009/0314550 A1 | 12/2009 | Layton |
| 2010/0047752 A1 | 2/2010 | Chan et al. |
| 2010/0094312 A1 | 4/2010 | Ruiz Morales et al. |
| 2010/0094730 A1 | 4/2010 | Di Betta et al. |
| 2010/0099067 A1 | 4/2010 | Agro |
| 2010/0167248 A1 | 7/2010 | Ryan |
| 2010/0167249 A1 | 7/2010 | Ryan |
| 2010/0167250 A1 | 7/2010 | Ryan et al. |
| 2010/0167253 A1* | 7/2010 | Ryan .................... G09B 23/30 |
| | | 434/272 |
| 2010/0167254 A1 | 7/2010 | Nguyen |
| 2010/0196867 A1 | 8/2010 | Geerligs et al. |
| 2010/0204713 A1 | 8/2010 | Ruiz Morales |
| 2010/0209899 A1 | 8/2010 | Park |
| 2010/0258611 A1 | 10/2010 | Smith et al. |
| 2010/0273136 A1 | 10/2010 | Kandasami et al. |
| 2010/0279263 A1 | 11/2010 | Duryea |
| 2010/0324541 A1 | 12/2010 | Whitman |
| 2011/0046637 A1 | 2/2011 | Patel et al. |
| 2011/0046659 A1 | 2/2011 | Ramstein et al. |
| 2011/0087238 A1 | 4/2011 | Wang et al. |
| 2011/0091855 A1 | 4/2011 | Miyazaki |
| 2011/0137337 A1 | 6/2011 | van den Dool et al. |
| 2011/0200976 A1 | 8/2011 | Hou et al. |
| 2011/0207104 A1 | 8/2011 | Trotta |
| 2011/0217684 A1* | 9/2011 | Park .................... G09B 23/285 |
| | | 434/268 |
| 2011/0218550 A1 | 9/2011 | Ma |
| 2011/0244436 A1 | 10/2011 | Campo |
| 2011/0269109 A2 | 11/2011 | Miyazaki |
| 2011/0281251 A1 | 11/2011 | Mousques |
| 2011/0301620 A1 | 12/2011 | Di Betta et al. |
| 2012/0015337 A1 | 1/2012 | Hendrickson et al. |
| 2012/0015339 A1 | 1/2012 | Hendrickson et al. |
| 2012/0016362 A1 | 1/2012 | Heinrich et al. |
| 2012/0028231 A1 | 2/2012 | Misawa et al. |
| 2012/0045743 A1 | 2/2012 | Misawa et al. |
| 2012/0065632 A1 | 3/2012 | Shadduck |
| 2012/0082970 A1* | 4/2012 | Pravong .............. G09B 23/285 |
| | | 434/262 |
| 2012/0100217 A1 | 4/2012 | Green et al. |
| 2012/0115117 A1* | 5/2012 | Marshall ................ G09B 23/28 |
| | | 434/262 |
| 2012/0115118 A1 | 5/2012 | Marshall |
| 2012/0116391 A1 | 5/2012 | Houser et al. |
| 2012/0148994 A1 | 6/2012 | Hori et al. |
| 2012/0157788 A1* | 6/2012 | Serowski ........... A61B 17/0206 |
| | | 600/229 |
| 2012/0164616 A1 | 6/2012 | Endo et al. |
| 2012/0165866 A1 | 6/2012 | Kaiser et al. |
| 2012/0172873 A1 | 7/2012 | Artale et al. |
| 2012/0179072 A1 | 7/2012 | Kegreiss |
| 2012/0202180 A1 | 8/2012 | Stock et al. |
| 2012/0264096 A1 | 10/2012 | Taylor et al. |
| 2012/0264097 A1 | 10/2012 | Newcott et al. |
| 2012/0282583 A1 | 11/2012 | Thaler et al. |
| 2012/0282584 A1 | 11/2012 | Millon et al. |
| 2012/0283707 A1 | 11/2012 | Giordano et al. |
| 2012/0288839 A1 | 11/2012 | Crabtree |
| 2012/0308977 A1 | 12/2012 | Tortola |
| 2013/0087597 A1 | 4/2013 | Shelton, IV et al. |
| 2013/0101973 A1 | 4/2013 | Hoke et al. |
| 2013/0105552 A1 | 5/2013 | Weir et al. |
| 2013/0116668 A1 | 5/2013 | Shelton, IV et al. |
| 2013/0157240 A1 | 6/2013 | Hart et al. |
| 2013/0171288 A1 | 7/2013 | Harders |
| 2013/0177890 A1 | 7/2013 | Sakezles |
| 2013/0192741 A1 | 8/2013 | Trotta et al. |
| 2013/0218166 A1 | 8/2013 | Elmore |
| 2013/0224709 A1 | 8/2013 | Riojas et al. |
| 2013/0245681 A1 | 9/2013 | Straehnz et al. |
| 2013/0253480 A1 | 9/2013 | Kimball et al. |
| 2013/0267876 A1 | 10/2013 | Leckenby et al. |
| 2013/0282038 A1 | 10/2013 | Dannaher et al. |
| 2013/0288216 A1 | 10/2013 | Parry, Jr. et al. |
| 2013/0302771 A1 | 11/2013 | Alderete |
| 2013/0324991 A1 | 12/2013 | Clem et al. |
| 2013/0324999 A1 | 12/2013 | Price et al. |
| 2014/0011172 A1 | 1/2014 | Lowe |
| 2014/0017651 A1 | 1/2014 | Sugimoto et al. |
| 2014/0030682 A1 | 1/2014 | Thilenius |
| 2014/0038151 A1* | 2/2014 | Hart .................... G09B 23/28 |
| | | 434/262 |
| 2014/0051049 A1 | 2/2014 | Jarc et al. |
| 2014/0072941 A1 | 3/2014 | Hendrickson et al. |
| 2014/0087345 A1 | 3/2014 | Breslin et al. |
| 2014/0087346 A1 | 3/2014 | Breslin et al. |
| 2014/0087347 A1 | 3/2014 | Tracy et al. |
| 2014/0087348 A1 | 3/2014 | Tracy et al. |
| 2014/0088413 A1 | 3/2014 | Von Bucsh et al. |
| 2014/0093852 A1 | 4/2014 | Poulsen et al. |
| 2014/0093854 A1 | 4/2014 | Poulsen et al. |
| 2014/0099858 A1 | 4/2014 | Hernandez |
| 2014/0106328 A1* | 4/2014 | Loor .................... G09B 23/285 |
| | | 434/272 |
| 2014/0107471 A1 | 4/2014 | Haider et al. |
| 2014/0156002 A1 | 6/2014 | Thompson et al. |
| 2014/0162016 A1 | 6/2014 | Matsui et al. |
| 2014/0170623 A1 | 6/2014 | Jarstad et al. |
| 2014/0186809 A1 | 7/2014 | Hendrickson et al. |
| 2014/0200561 A1 | 7/2014 | Ingmanson et al. |
| 2014/0212861 A1 | 7/2014 | Romano |
| 2014/0220527 A1 | 8/2014 | Li et al. |
| 2014/0220530 A1 | 8/2014 | Merkle et al. |
| 2014/0220532 A1 | 8/2014 | Ghez et al. |
| 2014/0242564 A1 | 8/2014 | Pravong et al. |
| 2014/0246479 A1 | 9/2014 | Baber et al. |
| 2014/0248596 A1 | 9/2014 | Hart et al. |
| 2014/0263538 A1 | 9/2014 | Leimbach et al. |
| 2014/0272878 A1 | 9/2014 | Shim et al. |
| 2014/0272879 A1 | 9/2014 | Shim et al. |
| 2014/0275795 A1 | 9/2014 | Little et al. |
| 2014/0275981 A1 | 9/2014 | Selover et al. |
| 2014/0277017 A1 | 9/2014 | Leimbach et al. |
| 2014/0303643 A1 | 10/2014 | Ha et al. |
| 2014/0303646 A1 | 10/2014 | Morgan et al. |
| 2014/0303660 A1 | 10/2014 | Boyden et al. |
| 2014/0308643 A1 | 10/2014 | Trotta et al. |
| 2014/0342334 A1 | 11/2014 | Black et al. |
| 2014/0349266 A1 | 11/2014 | Choi |
| 2014/0350530 A1 | 11/2014 | Ross et al. |
| 2014/0357977 A1 | 12/2014 | Zhou |
| 2014/0370477 A1 | 12/2014 | Black et al. |
| 2014/0371761 A1 | 12/2014 | Juanpera |
| 2014/0378995 A1 | 12/2014 | Kumar et al. |
| 2015/0031008 A1 | 1/2015 | Black et al. |
| 2015/0037773 A1 | 2/2015 | Quirarte Catano |
| 2015/0038613 A1 | 2/2015 | Sun et al. |
| 2015/0076207 A1 | 3/2015 | Boudreaux et al. |
| 2015/0086955 A1 | 3/2015 | Poniatowski et al. |
| 2015/0132732 A1 | 5/2015 | Hart et al. |
| 2015/0132733 A1 | 5/2015 | Garvik et al. |
| 2015/0135832 A1 | 5/2015 | Blumenkranz et al. |
| 2015/0148660 A1 | 5/2015 | Weiss et al. |
| 2015/0164598 A1 | 6/2015 | Blumenkranz et al. |
| 2015/0187229 A1 | 7/2015 | Wachli et al. |
| 2015/0194075 A1 | 7/2015 | Rappel et al. |
| 2015/0202299 A1 | 7/2015 | Burdick et al. |
| 2015/0209035 A1 | 7/2015 | Zemlock |
| 2015/0209059 A1 | 7/2015 | Trees et al. |
| 2015/0209573 A1 | 7/2015 | Hibner et al. |
| 2015/0228206 A1 | 8/2015 | Shim et al. |

(56) References Cited

U.S. PATENT DOCUMENTS

| | | |
|---|---|---|
| 2015/0262511 A1 | 9/2015 | Lin et al. |
| 2015/0265431 A1 | 9/2015 | Egilsson et al. |
| 2015/0272571 A1 | 10/2015 | Leimbach et al. |
| 2015/0272574 A1 | 10/2015 | Leimbach et al. |
| 2015/0272580 A1 | 10/2015 | Leimbach et al. |
| 2015/0272581 A1 | 10/2015 | Leimbach et al. |
| 2015/0272583 A1 | 10/2015 | Leimbach et al. |
| 2015/0272604 A1 | 10/2015 | Chowaniec et al. |
| 2015/0332609 A1 | 11/2015 | Alexander |
| 2015/0358426 A1 | 12/2015 | Kimball et al. |
| 2015/0371560 A1 | 12/2015 | Lowe |
| 2015/0374378 A1 | 12/2015 | Giordano et al. |
| 2015/0374449 A1 | 12/2015 | Chowaniec et al. |
| 2016/0000437 A1 | 1/2016 | Giordano et al. |
| 2016/0022374 A1 | 1/2016 | Haider et al. |
| 2016/0030240 A1 | 2/2016 | Gonenc et al. |
| 2016/0031091 A1 | 2/2016 | Popovic et al. |
| 2016/0066909 A1 | 3/2016 | Baber et al. |
| 2016/0070436 A1 | 3/2016 | Thomas et al. |
| 2016/0073928 A1 | 3/2016 | Soper et al. |
| 2016/0074103 A1 | 3/2016 | Sartor |
| 2016/0098933 A1 | 4/2016 | Reiley et al. |
| 2016/0104394 A1 | 4/2016 | Miyazaki |
| 2016/0117956 A1 | 4/2016 | Larsson et al. |
| 2016/0133158 A1 | 5/2016 | Sui et al. |
| 2016/0140876 A1 | 5/2016 | Jabbour et al. |
| 2016/0199059 A1 | 7/2016 | Shelton, IV et al. |
| 2016/0220150 A1 | 8/2016 | Sharonov |
| 2016/0220314 A1 | 8/2016 | Huelman et al. |
| 2016/0225288 A1 | 8/2016 | East et al. |
| 2016/0232819 A1 | 8/2016 | Hofstetter et al. |
| 2016/0235494 A1 | 8/2016 | Shelton, IV et al. |
| 2016/0256187 A1 | 9/2016 | Shelton, IV et al. |
| 2016/0256229 A1 | 9/2016 | Morgan et al. |
| 2016/0262736 A1 | 9/2016 | Ross et al. |
| 2016/0262745 A1 | 9/2016 | Morgan et al. |
| 2016/0293055 A1 | 10/2016 | Hofstetter |
| 2016/0296144 A1 | 10/2016 | Gaddam et al. |

FOREIGN PATENT DOCUMENTS

| | | |
|---|---|---|
| CN | 2909427 Y | 6/2007 |
| CN | 101313842 A | 12/2008 |
| CN | 201364679 Y | 12/2009 |
| CN | 202443680 U | 9/2012 |
| CN | 202563792 U | 11/2012 |
| CN | 202601055 U | 12/2012 |
| CN | 202694651 U | 1/2013 |
| CN | 103050040 A | 4/2013 |
| CN | 203013103 U | 6/2013 |
| CN | 203038549 U | 7/2013 |
| CN | 201955979 U | 12/2013 |
| CN | 203338651 U | 12/2013 |
| CN | 203397593 U | 1/2014 |
| CN | 203562128 U | 4/2014 |
| CN | 10388679 A | 6/2014 |
| DE | 9102218 U1 | 5/1991 |
| DE | 41 05 892 | 8/1992 |
| DE | 44 14 832 | 11/1995 |
| DE | 19716341 C2 | 9/2000 |
| EP | 1 024 173 | 8/2000 |
| EP | 2 218 570 A1 | 8/2010 |
| FR | 2 691 826 | 12/1993 |
| FR | 2 917 876 | 12/2008 |
| FR | 2 917 876 A1 | 12/2008 |
| GB | 2488994 A | 9/2012 |
| JP | 10 211160 | 8/1998 |
| JP | 2001005378 A | 1/2001 |
| JP | 2009236963 A | 10/2009 |
| JP | 3162161 U | 8/2010 |
| JP | 2013127496 A | 6/2013 |
| MX | PA 02004422 A | 11/2003 |
| MX | PA02004422 A | 11/2003 |
| PT | 106230 | 9/2013 |
| WO | WO 94/06109 | 3/1994 |
| WO | WO 96/42076 | 2/1996 |
| WO | WO 98/58358 | 12/1998 |
| WO | WO 1999/01074 A1 | 1/1999 |
| WO | WO 2000/36577 | 6/2000 |
| WO | WO/2002/38039 A2 | 5/2002 |
| WO | WO 2002/038039 A3 | 5/2002 |
| WO | WO 2004/032095 | 4/2004 |
| WO | WO 2004/082486 A1 | 9/2004 |
| WO | WO 2005/071639 A1 | 8/2005 |
| WO | WO 2006/083963 A2 | 8/2006 |
| WO | WO 2007/068360 | 6/2007 |
| WO | WO 2008/021720 | 2/2008 |
| WO | WO 2009/000939 | 12/2008 |
| WO | WO 2009/089614 A1 | 7/2009 |
| WO | WO 2010/094730 | 8/2010 |
| WO | WO 2011/035410 A1 | 3/2011 |
| WO | WO 2011/046606 A1 | 4/2011 |
| WO | WO 2011/151304 A1 | 12/2011 |
| WO | WO 2012/149606 A1 | 11/2012 |
| WO | WO 2012168287 A1 | 12/2012 |
| WO | WO 2012175993 | 12/2012 |
| WO | WO 2013/048978 | 4/2013 |
| WO | WO 2013/103956 A1 | 7/2013 |
| WO | WO 2014/022815 | 2/2014 |
| WO | WO 2014/093669 A1 | 6/2014 |
| WO | WO 2015/148817 A1 | 10/2015 |
| WO | WO 2016/183412 A1 | 11/2016 |
| WO | WO 2016/201085 A1 | 12/2016 |

OTHER PUBLICATIONS

The International Bureau of WIPO, International Preliminary Report on Patentability for International Application No. PCT/US2012/060997, titled "Simulated Tissue Structure for Surgical Training" dated Apr. 22, 2014.

European Patent Office, International Search Report for International Application No. PCT/US2011/053859 A3, dated May 4, 2012, entitled "Portable Laparoscopic Trainer".

European Patent Office, The International Search Report and Written Opinion for International Application No. PCT/US2012/60997, dated Mar. 7, 2013, entitled "Simulated Tissue Structure for Surgical Training".

European Patent Office, The International Search Report and Written Opinion for International Application No. PCT/US2012/070971, dated Mar. 18, 2013, entitled "Advanced Surgical Simulation".

Human Patient Simulator, Medical Education Technologies, Inc., http://www.meti.com (1999) all.

The International Bureau of WIPO, International Preliminary Report on Patentability for International Application No. PCT/US2011/053859, titled "Portable Laparoscopic Trainer" dated Apr. 2, 2013.

European Patent Office, The International Search Report and Written Opinion for International Application No. PCT/US2013/062363, dated Jan. 22, 2014, entitled "Surgical Training Model for Laparoscopic Procedures".

European Patent Office, The International Search Report and Written Opinion for International Application No. PCT/US2013/061949, dated Feb. 17, 2014, entitled "Surgical Training Model for Laparoscopic Procedures".

Anonymous: Realsim Systems—LTS2000, Sep. 4, 2005, pp. 1-2, XP055096193, Retrieved from the Internet: URL:https://web.archive.org/web/2005090403;3030/http://www.realsimsystems.com/exersizes.htm (retrieved on Jan. 14, 2014).

European Patent Office, The International Search Report and Written Opinion for International Application No. PCT/US2013/061557, dated Feb. 10, 2014, entitled "Surgical Training Model for Laparoscopic Procedures".

European Patent Office, The International Search Report and Written Opinion for International Application No. PCT/US2013/061728 dated Oct. 18, 2013, entitled "Surgical Training Model for Laparoscopic Procedures".

European Patent Office, The International Search Report and Written Opinion for International Application No. PCT/US2013/062269, dated Feb. 17, 2014, entitled "Surgical Training Model for Transluminal Procedures".

(56) References Cited

OTHER PUBLICATIONS

The International Bureau of WIPO, International Preliminary Report on Patentability for International Application No. PCT/US2012/070971, titled "Advanced Surgical Simulation" dated Jun. 24, 2014.
The International Bureau of WIPO, International Preliminary Report on Patentability for international application No. PCT/US2013/061728, titled Surgical Training Model for Laparoscopic Procedures, dated Apr. 9, 2015.
European Patent Office, The International Search Report and Written Opinion for International Application No. PCT/US2014/019840 dated Jul. 4, 2014 entitled "Advanced Surgical Simulation Constructions and Methods."
European Patent Office, The International Search Report and Written Opinion of the International Searching Authority for International Application No. PCT/US2014/038195 titled "Hernia Model", dated Oct. 15, 2014.
Kurashima Y et al, "A tool for training and evaluation of Laparoscopic inguinal hernia repair; the Global Operative Assessment of Laparoscopic Skills-Groin Hernia" American Journal of Surgery, Paul Hoeber, New York, NY, US vol. 201, No. 1, Jan. 1, 2011, pp. 54-61 XP027558745.
European Patent Office, The International Search Report and Written Opinion for International Application No. PCT/US2014/042998, title; Gallbladder Model, dated Jan. 7, 2015.
The International Bureau of WIPO, International Preliminary Report on Patentability for International Application No. PCT/US2013/062363, titled Surgical Training Model for Laparoscopic Procedures, dated Apr. 9, 2015.
The International Bureau of WIPO, International Preliminary Report on Patentability for International Application No. PCT/US2013/062269, titled Surgical Training Model for Laparoscopic Procedures, dated Apr. 9, 2015.
The International Bureau of WIPO, International Preliminary Report on Patentability for International Application No. PCT/US2013/061557, titled Surgical Training Model for Laparoscopic Procedures, dated Apr. 9, 2015.
The International Bureau of WIPO, International Preliminary Report on Patentability, for PCT application No. PCT/US2013/053497, titled, Simulated Stapling and Energy Based Ligation for Surgical Training, dated Feb. 12, 2015.
European Patent Office, The International Search Report and Written Opinion of the International Searching Authority for International Application No. PCT/US2014/048027 titled "First Entry Model", dated Oct. 17, 2014.
European Patent Office, The International Search Report and Written Opinion for International Application No. PCT/US2015/020574, titled "Advanced First Entry Model for Surgical Simulation," dated Jun. 1, 2015.
European Patent Office, The International Search Report and Written Opinion for International Application No. PCT/US2015/022774, dated Jun. 11, 2015 entitled "Simulated Dissectible Tissue."
Anonymous: Silicone rubber-from Wikipedia, the free encyclopedia, pp. 1-6, XP055192375, Retrieved from the Internet: URL:http://en.wikipedia.org/w.index.php?title=Silicone_rubber&oldid=596456058 (retrieved on May 29, 2015).
Lamouche, et al., "Review of tissue simulating phantoms with controllable optical, mechanical and structural properties for use in optical coherence tomography," Biomedical Optics Express, Jun. 1, 2012, 18 pgs., vol. 3, No. 6.
The International Bureau of WIPO, International Preliminary Report on Patentability for International Application No. PCT/US2014/019840, titled Simulated Tissue Structure for Surgical Training, dated Sep. 11, 2015.
European Patent Office, International Search Report and Written Opinion for International Application No. PCT/US2013/053497 titled "Simulated Stapling and Energy Based Ligation for Surgical Training" dated Nov. 5, 2013.

The International Bureau of WIPO, International Preliminary Report on Patentability for International Application No. PCT/US2014/038195, titled Hernia Model, dated Nov. 26, 2015.
The International Bureau of WIPO, International Preliminary Report on Patentability for International Application No. PCT/US2014/042998, titled "Gallbladder Model" dated Dec. 30, 2015.
The International Bureau of WIPO, International Preliminary Report on Patentability for International Application No. PCT/US2014/048027, titled "First Entry Model" dated Feb. 4, 2016.
European Patent Office, Invitation to Pay Additional Fees for International Application No. PCT/US2016/062669, titled "Simulated Dissectible Tissue", mailed Feb. 10, 2017, 8 pgs.
European Patent Office, The International Search Report and Written Opinion of the International Searching Authority for International Application No. PCT/US2016/055148 titled "Hysterectomy Model", dated Feb. 28, 2017, 12 pgs.
European Patent Office, Examination Report for European Application No. 14733949.3 titled "Gallbladder Model," dated Dec. 21, 2016, 6 pgs.
European Patent Office, The International Search Report and Written Opinion of the International Searching Authority for International Application No. PCT/US2016/062669 titled "Simulated Dissectible Tissue," dated Apr. 5, 2017, 19 pgs.
European Patent Office, The International Search Report and Written Opinion of the International Searching Authority for International Application No. PCT/US2017/020389 titled "Simulated Tissue Cartridge", dated May 24, 2017, 13 pgs.
The International Bureau of WIPO, International Preliminary Report on Patentability and Written Opinion for International Application No. PCT/US2015/059668, entitled "Simulated Tissue Models and Methods," dated May 26, 2017, 16 pgs.
The International Bureau of WIPO, International Preliminary Report on Patentability for International Application No. PCT/US2015/020574, entitled "Advanced First Entry Model for Surgical Simulation," dated Sep. 22, 2016, 9 pgs.
European Patent Office, The International Search Report and Written Opinion of the International Searching Authority for International Application No. PCT/US2016/0043277 titled "Appendectomy Model", dated Oct. 4, 2016, 12 pgs.
The International Bureau of WIPO, International Preliminary Report on Patentability for International Application No. PCT/US2015/022774, titled "Simulated Dissectible Tissue," dated Oct. 6, 2016, 9 pgs.
European Patent Office, The International Search Report and Written Opinion of the International Searching Authority for International Application No. PCT/US2016/041852 titled "Simulated Dissectible Tissue", dated Oct. 13, 2016, 12 pgs.
Society of Laparoendoscopic Surgeons, "Future Technology Session: The Edge of Innovation in Surgery, Space, and Business" http://www.laparoscopytoday.com/endourology/page/2/, Figure 1B: http://laparoscopy.blogs.com/laparoscopy_today/images/6-1/6-1VlaovicPicB.jpg , Sep. 5-8, 2007, 10 pgs.
Miyazaki Enterprises, "Miya Model Pelvic Surgery Training Model and Video," www.miyazakienterprises, printed Jul. 1, 2016, 1 pg.
European Patent Office, International Search Report and Written Opinion for International Application No. PCT/US2015/059668 titled "Simulated Tissue Models and Methods" dated Apr. 26, 2016, 20 pgs.
Australian Patent Office, Patent Examination Report No. 1 for Australian Application No. 2012358851 titled "Advanced Surgical Simulation" dated May 26, 2016, 3 pgs.
European Patent Office, International Search Report and Written Opinion for International Application No. PCT/US2016/032292 titled "Synthetic Tissue Structures for Electrosurgical Training and Simulation," dated Jul. 14, 2016, 11 pgs.
European Patent Office, International Search Report and Written Opinion for International Application No. PCT/US2016/018697 titled "Simulated Tissue Structures and Methods," dated Jul. 14, 2016, 21 pgs.
European Patent Office, International Search Report and Written Opinion for International Application No. PCT/US2016/034591 titled "Surgical Training Model for Laparoscopic Procedures," dated Aug. 8, 2016, 18 pgs.

(56) References Cited

OTHER PUBLICATIONS

European Patent Office, The International Search Report and Written Opinion of the International Searching Authority for International Application No. PCT/US2016/036664 titled "Hysterectomy Model", dated Aug. 19, 2016, 15 pgs.
3D-MED Corporation, "Validated Training Course for Laparoscopic Skills", https://www.3-dmed.com/sites/default/files/product-additional/product-spec/Validated%20Training%20Course%20for%20Laparoscopic%20Skills.docx_3.pdf, printed Aug. 23, 2016, pp. 1-6.
3D-MED Corporation, "Loops and Wire #1" https://www.3-dmed.com/product/loops-and-wire-1, printed Aug. 23, 2016, 4 pgs.
Barrier, et al., "A Novel and Inexpensive Vaginal Hysterectomy Simulatory," Simulation in Healthcare: The Journal of the Society for Simulation in Healthcare, vol. 7, No. 6, Dec. 1, 2012, pp. 374-379.
The International Bureau of WIPO, International Preliminary Report on Patentability and Written Opinion for International Application No. PCT/US2016/018697, entitled "Simulated Tissue Structures and Methods," dated Aug. 31, 2017, 14 pgs.
The International Bureau of WIPO, International Preliminary Report on Patentability for International Application No. PCT/US2016/055148, entitled "Hysterectomy Model," dated Apr. 12, 2018, 12 pgs.
European Patent Office, The International Search Report and Written Opinion for International Application No. PCT/US2018/018895, entitled "Synthetic Tissue Structures for Electrosurgical Training and Simulation," dated May 17, 2018, 12 pgs.
The International Bureau of WIPO, International Preliminary Report on Patentability for International Application No. PCT/US2016/062669, entitled "Simulated Dissectible Tissue," dated May 31, 2018, 11 pgs.
European Patent Office, The International Search Report and Written Opinion for International Application No. PCT/US2018/018036, entitled "Laparoscopic Training System," dated Jun. 8, 2018, 13 pgs.
European Patent Office, The International Search Report and Written Opinion for International Application No. PCT/US2017/039113, entitled "Simulated Abdominal Wall," dated Aug. 7, 2017, 13 pgs.
The International Bureau of WIPO, International Preliminary Report on Patentability for International Application No. PCT/US2016/0032292, entitled "Synthetic Tissue Structures for Electrosurgical Training and Simulation," dated Nov. 23, 2017, 2017, 8 pgs.
The International Bureau of WIPO, International Preliminary Report on Patentability for International Application No. PCT/US2016/034591, entitled "Surgical Training Model for Laparoscopic Procedures," dated Dec. 7, 2017, 2017, 14 pgs.
The International Bureau of WIPO, International Preliminary Report on Patentability for International Application No. PCT/US2016/036664, entitled "Hysterectomy Model," dated Dec. 21, 2017, 10 pgs.
The International Bureau of WIPO, International Preliminary Report on Patentability for International Application No. PCT/US2016/041852, entitled "Simulated Dissectible Tissue," dated Jan. 25, 2018, 12 pgs.
European Patent Office, Extended European Search Report for European Patent Application No. EP 17202365.7, titled "Gallbladder Model", dated Jan. 31, 2018, 8 pgs.
The International Bureau of WIPO, International Preliminary Report on Patentability for International Application No. PCT/US2016/043277, entitled "Appendectomy Model," dated Feb. 1, 2018, 9 pgs.

\* cited by examiner

SURGICAL TRAINING MODEL FOR LAPAROSCOPIC PROCEDURES

CROSS-REFERENCE TO RELATED APPLICATIONS

This application claims priority to and benefit of U.S. Provisional Patent Application Ser. No. 61/705,972 entitled "Surgical training model for laparoscopic procedures" filed on Sep. 26, 2012 which is incorporated herein by reference in its entirety.

FIELD OF THE INVENTION

This application is generally related to surgical training tools, and in particular, to simulated tissue structures and models for teaching and practicing various surgical techniques and procedures related but not limited to laparoscopic, endoscopic and minimally invasive surgery.

BACKGROUND OF THE INVENTION

Medical students as well as experienced doctors learning new surgical techniques must undergo extensive training before they are qualified to perform surgery on human patients. The training must teach proper techniques employing various medical devices for cutting, penetrating, clamping, grasping, stapling, cauterizing and suturing a variety of tissue types. The range of possibilities that a trainee may encounter is great. For example, different organs and patient anatomies and diseases are presented. The thickness and consistency of the various tissue layers will also vary from one part of the body to the next and from one patient to another. Different procedures demand different skills. Furthermore, the trainee must practice techniques in varying anatomical environs that depend on factors such as the size and condition of the patient, the adjacent anatomical landscape and the types of targeted tissues and whether they are readily accessible or relatively inaccessible.

Numerous teaching aids, trainers, simulators and model organs are available for one or more aspects of surgical training. However, there is a need for model organs or simulated tissue elements that are likely to be encountered in and that can be used in practicing endoscopic, laparoscopic, minimally invasive surgical procedures. In laparoscopic or minimally invasive surgery, a small incision, as small as 5-10 mm is made through which a trocar or cannula is inserted to create a channel for the insertion of a camera, such as a laparoscope. The camera provides a live video feed capturing images that are then displayed to the surgeon on one or more monitors. At least one additional small incision is made through which another trocar/cannula is inserted to create a pathway through which surgical instruments can be passed for performing procedures observed on the monitor. The targeted tissue location such as the abdomen is typically enlarged by delivering carbon dioxide gas to insufflate the body cavity and create a working space large enough to safely accommodate the scope and instruments used by the surgeon. The insufflation pressure in the tissue cavity is maintained by using specialized trocars. Laparoscopic surgery offers a number of advantages when compared with an open procedure. These advantages include reduced pain, reduced blood and shorter recovery times due to the smaller incisions.

Laparoscopic or endoscopic minimally invasive surgery requires an increased level of skill compared to open surgery because the target tissue is not directly observed by the clinician. The target tissue is observed on monitors displaying a portion of the surgical site that is accessed through a small opening. Therefore, clinicians need to practice visually determining tissue planes, three-dimensional depth perception on a two-dimensional viewing screen, hand-to-hand transfer of instruments, suturing, precision cutting and tissue and instrument manipulation. Typically, models simulating a particular anatomy or procedure are placed in a simulated pelvic trainer where the anatomical model is obscured from direct visualization by the practitioner. Ports in the trainer are employed passing instruments to practice techniques on the anatomical model hidden from direct visualization. Simulated pelvic trainers provide a functional, inexpensive and practical means in place of expensive cadaver labs to train surgeons and residents the basic skills and typical techniques used in laparoscopic surgery such as grasping, manipulating, cutting, knot tying, suturing, stapling, cauterizing as well as how to perform specific surgical procedures that utilize these basic skills. Simulated pelvic trainers are also effective sales tools for demonstrating medical devices required to perform these laparoscopic procedures.

One of the techniques mentioned above that requires practice in laparoscopic minimally invasive surgery is suturing or stapling. For example, in laparoscopic hysterectomies in which the uterus is laparoscopically removed, the vaginal vault is closed by suturing. It is desirable to present a model for practicing this suturing or stapling of the vaginal cuff and other OB/GYN surgical skills. Hence, it is desirable to have a model that not only simulates the particular anatomy but also presents the anatomy at a particular step or stage of the procedure or isolates a particular step of a procedure for the trainee to practice in a simulated laparoscopic environment. The model is then disposed inside a simulated laparoscopic environment such as a laparoscopic trainer in which it is at least partially obscured from direct visualization. A camera and monitor provide visualization to the practitioner. After a technique is practiced, it is furthermore desirable that such a model permits repeatable practice with ease, speed and cost savings. In view of the above, it is an object of this invention to provide a surgical training device that realistically simulates an anatomy, isolates such anatomy and presents such an anatomy at a particular stage or step of a procedure that also enables repeatable practice. It has been demonstrated that the use of simulation trainers greatly enhances the skill levels of new laparoscopists and are a great tool to train future surgeons in a non-surgical setting. There is a need for such improved, realistic and effective surgical training models.

SUMMARY OF THE INVENTION

According to one aspect of the invention, a surgical training device for training laparoscopic surgical skills is provided. The training device includes a simulated tissue model having a first simulated tissue. The first simulated tissue has a tubular form comprising a first central lumen having an inner surface interconnecting an opening at the proximal end and an opening at a distal end. At least the distal end of the first simulated tissue is compressible. The model further includes a first holder having a proximal end and a distal end. The first holder is connected to the first simulated tissue such that the opening at the proximal end of the first simulated tissue is stretched over the first holder locating at least a part of the first holder inside the first central lumen of the first simulated tissue. The first simulated tissue is connected to the first holder such that the opening at the distal end of the first simulated tissue is distal to the distal end of the first holder by a length defining a first overhanging portion of the first simulated tissue. The overhanging portion simulates a vaginal cuff which is sutured or stapled closed by the practitioner.

According to another aspect of the invention, surgical training device is provided. The surgical training device includes a first simulated tissue having a tubular form comprising a first central lumen interconnecting an opening at a proximal end and an opening at a distal end. The training device further includes a first holder having a proximal end and a distal end. The first holder is connected to the first simulated tissue such that the opening at the proximal end of the first simulated tissue is stretched over the first holder locating the first holder at least partially inside the first central lumen of the first simulated tissue. The training device includes a second holder having a proximal end and a distal end. The second holder is connected to the first simulated tissue such that the opening at the distal end of the first simulated tissue is stretched over the second holder locating the second holder at least partially inside the first central lumen at the distal end of the first simulated tissue. The distal end of the first holder is spaced apart from the distal end of the second holder by a length defining a gap that is spanned by the first simulated tissue.

According to another aspect of the invention, a surgical training device is provided. The surgical training device includes an elongate first simulated tissue made of flexible material and having an outer surface and an inner surface. The inner surface defines a lumen interconnecting an opening at a distal end and an opening at a proximal end. The first simulated tissue is compressible such that the distal end of the lumen is closable. The training device further includes a base having an upper surface and a lower surface and a first holder having a proximal end and a distal end. The proximal end of the first holder is connected to the upper surface of the base and extends upwardly from the base. The first simulated tissue is connected to the first holder such that the proximal end of the first simulated tissue is connected to the first holder and the distal end of the first simulated tissue is distal to the distal end of the first holder by length defining a first overhanging portion of the first simulated tissue. The first overhanging portion maintains the opening at the distal end when connected to the first holder and the first overhanging portion is compressible to close the distal opening.

According to another aspect of the invention, a surgical training device is provided. The surgical training device includes an elongated simulated tissue structure made of a flexible material configured to hold surgical sutures and having a thickness between an outer surface and an inner surface. The inner surface of the simulated tissue structure defines a central lumen interconnecting an opening at a distal end and an opening at a proximal end. The simulated tissue structure has a circular or elliptical cross-section and an elastic tubular form that maintains the lumen opening when unstressed and is compressible under pressure to close the lumen. The simulated tissue structure is configured to be connected to a holder by being placed over the holder. The simulated tissue structure is configured to be connected to a holder by stretching the proximal end of the simulated tissue structure onto the distal end of the holder. The surgical training device further includes a holder having a distal end and a proximal end. The holder is sized and configured to fit inside the lumen of the simulated tissue structure such that the proximal end of the simulated tissue structure is stretched to insert the holder into the lumen and allowed to elastically contract onto the holder to maintain the simulated tissue structure connected to the holder. The simulated tissue structure is connected to the holder such that the opening at the distal end of the simulated tissue structure is distal to the distal end of the holder by a length defining an overhanging portion. The opening at the distal end of the overhanging portion is closable by compressing opposite sides of the simulated tissue structure. The opening at the distal end of the overhanging portion is closable by passing sutures through the overhanging portion to bring opposite sides of the simulated tissue structure together. The surgical training device includes a second elongated simulated tissue structure sized and configured to concentrically fit inside the simulated tissue structured. The second simulated tissue structure is made of flexible material and configured to hold surgical sutures and having a thickness between an outer surface and an inner surface. The inner surface of the second simulated tissue structure defines a central lumen interconnecting an opening at a distal end and an opening at a proximal end. The surgical training device further including clips configured to hold the simulated tissue structure connected to a base.

DETAILED DESCRIPTION OF THE INVENTION

Figure 1:
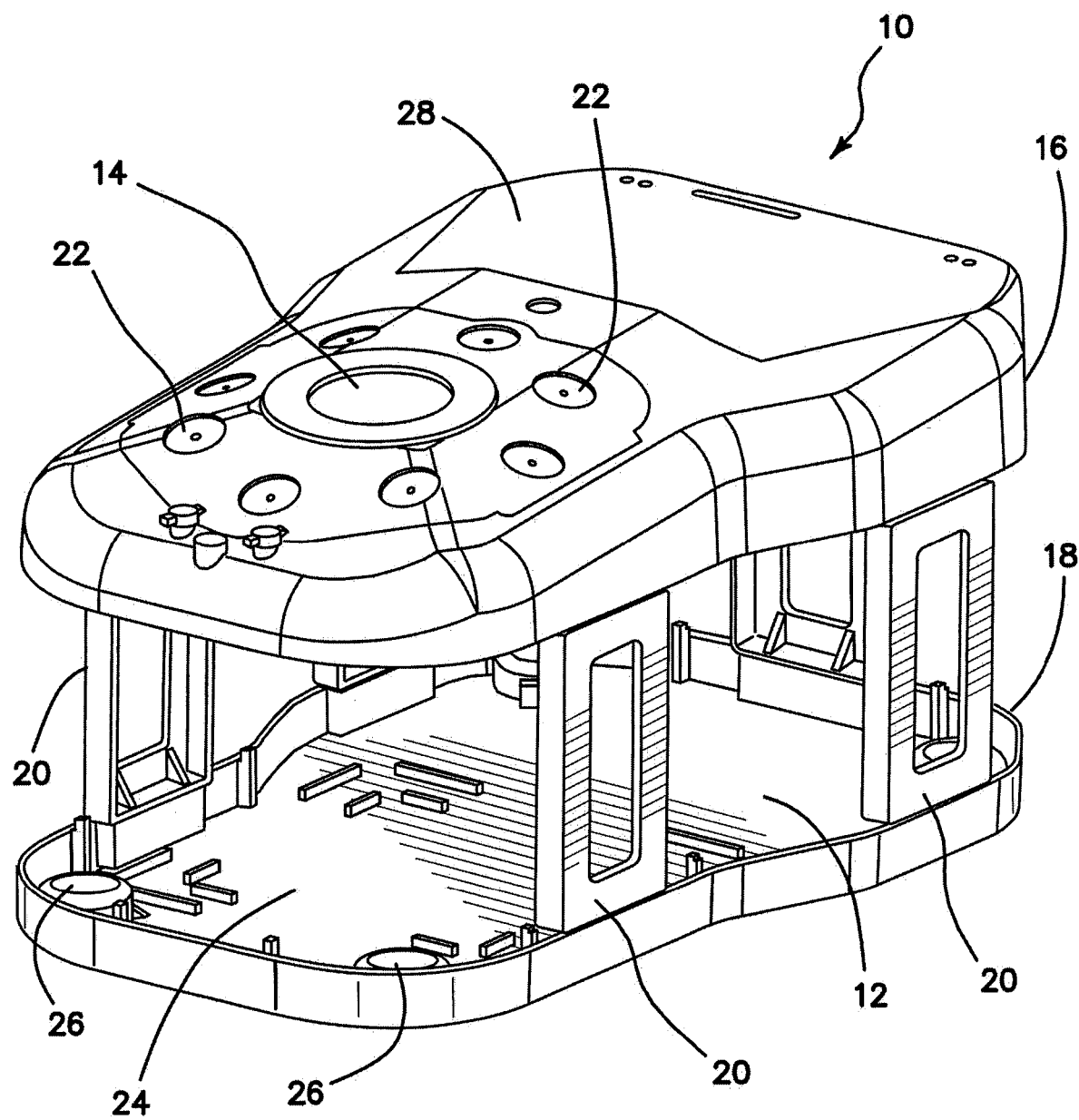
FIG. 1 illustrates a top perspective view of a surgical training device according to the present invention.

A surgical training device 10 that is configured to mimic the torso of a patient such as the abdominal region is shown in FIG. 1. The surgical training device 10 provides a body cavity 12 substantially obscured from the user and configured for receiving simulated or live tissue or a training model of the like described in this invention. The body cavity 12 is accessed via a tissue simulation region 14 that is penetrated by the user employing devices to practice surgical techniques on the tissue or organ model found located in the body cavity 12. Although the body cavity 12 is shown to be accessible through a tissue simulation region, a hand-assisted access device or single-site port device may be alternatively employed to access the body cavity 12. An exemplary surgical training device is described in U.S.

patent application Ser. No. 13/248,449 entitled "Portable Laparoscopic Trainer" filed on Sep. 29, 2011 and incorporated herein by reference in its entirety. The surgical training device 10 is particularly well suited for practicing laparoscopic or other minimally invasive surgical procedures.

Still referencing FIG. 1, the surgical training device 10 includes a top cover 16 connected to and spaced apart from a base 18 by at least one leg 20. FIG. 1 shows a plurality of legs 20. The surgical training device 10 is configured to mimic the torso of a patient such as the abdominal region. The top cover 16 is representative of the anterior surface of the patient and the space between the top cover 16 and the base 18 is representative of an interior of the patient or body cavity where organs reside. The surgical trainer 10 is a useful tool for teaching, practicing and demonstrating various surgical procedures and their related instruments in simulation of a patient undergoing a surgical procedure. Surgical instruments are inserted into the cavity 12 through the tissue simulation region 14 as well as through pre-established apertures 22 in the top cover 16. Various tools and techniques may be used to penetrate the top cover 16 to perform mock procedures on model organs placed between the top cover 16 and the base 18. The base 18 includes a model-receiving area 24 or tray for staging or holding a simulated tissue model or live tissue. The model-receiving area 24 of the base 18 includes frame-like elements for holding the model (not shown) in place. To help retain the simulated tissue model or live organs on the base 18, a clip attached to a retractable wire is provided at locations 26. The retractable wire is extended and then clipped to hold the tissue model in position substantially beneath the tissue simulation region 14. Other means for retaining the tissue model include a patch of hook-and-loop type fastening material (VELCRO®) affixed to the base 18 in the model receiving area 24 such that it is removably connectable to a complementary piece of hook-and-loop type fastening material (VELCRO®) affixed to the model.

A video display monitor 28 that is hinged to the top cover 16 is shown in a closed orientation in FIG. 1. The video monitor 28 is connectable to a variety of visual systems for delivering an image to the monitor. For example, a laparoscope inserted through one of the pre-established apertures 22 or a webcam located in the cavity and used to observe the simulated procedure can be connected to the video monitor 28 and/or a mobile computing device to provide an image to the user. Also, audio recording or delivery means may also be provided and integrated with the trainer 10 to provide audio and visual capabilities. Means for connecting a portable memory storage device such as a flash drive, smart phone, digital audio or video player, or other digital mobile device is also provided, to record training procedures and/or play back pre-recorded videos on the monitor for demonstration purposes. Of course, connection means for providing an audio visual output to a larger screen other than the monitor is provided. In another variation, the top cover 10 does not include a video display but includes means for supporting a laptop computer, a mobile digital device or tablet such as an IPAD® and connecting it by wire or wirelessly to the trainer.

When assembled, the top cover 16 is positioned directly above the base 18 with the legs 20 located substantially around the periphery and interconnected between the top cover 16 and base 18. The top cover 16 and base 18 are substantially the same shape and size and have substantially the same peripheral outline. The internal cavity is partially or entirely obscured from view. The top cover 16 is removable from the legs 20 which in turn are removable or collapsible via hinges or the like with respect to the base 18. Therefore, the unassembled trainer 10 has a reduced height that makes for easier portability. In essence, the surgical trainer 10 provides a simulated body cavity 12 that is obscured from the user. The body cavity 12 is configured to receive at least one surgical model accessible via at least one tissue simulation region 14 and/or apertures 22 in the top cover 16 through which the user may access the models to practice laparoscopic or endoscopic minimally invasive surgical techniques.

Figure 2:
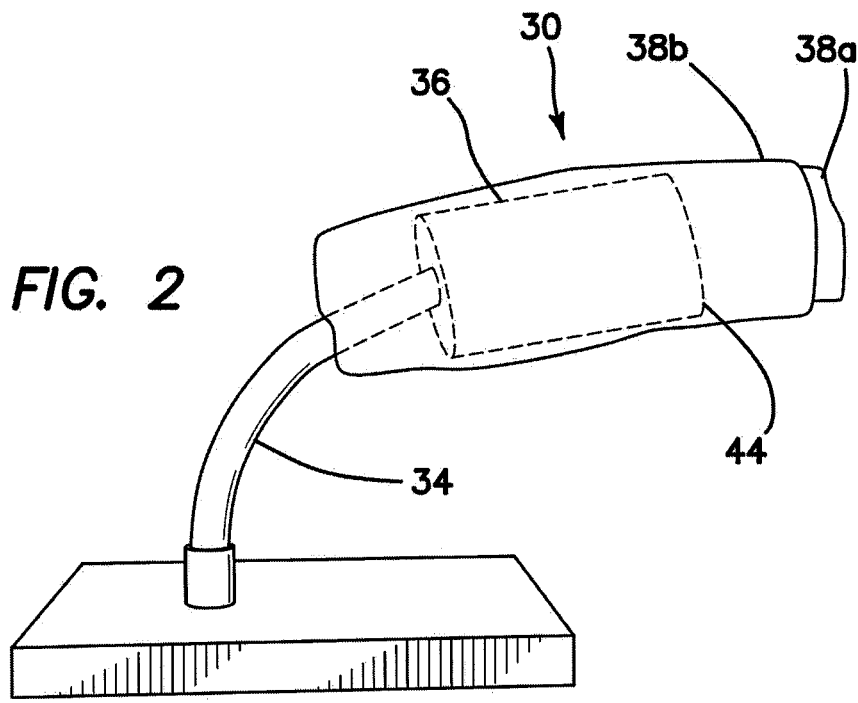
FIG. 2 illustrates a side perspective, partially transparent view of a cuff model with two cuffs according to the present invention.
Figure 3:
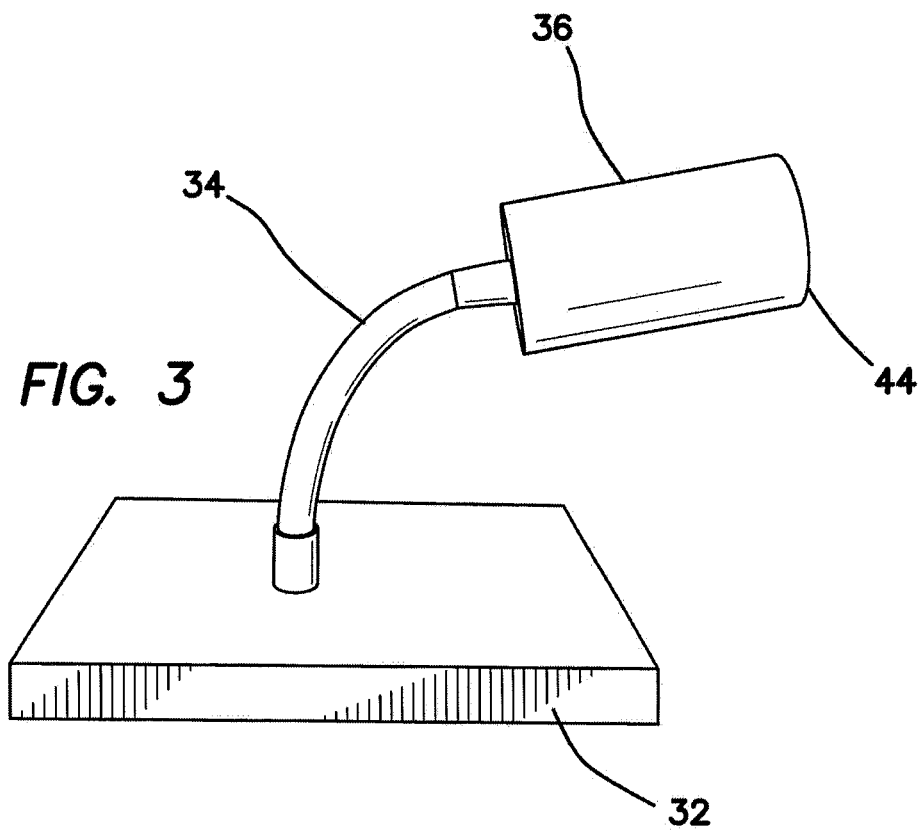
FIG. 3 illustrates a side perspective view of a cuff model showing a base, connector and cuff holder without a cuff according to the present invention.

A cuff model 30 according to the present invention is shown in FIG. 2. The cuff model 30 is configured to be placed inside the surgical training device 10 described above or other surgical trainer similar to the one described above. The cuff model 30 includes a base 32, a connector 34, a cuff-holder 36 and at least one cuff 38. FIG. 2 illustrates two cuffs 38a and 38b arranged such that one cuff 38b is placed over another cuff 38a. FIG. 3 illustrates the cuff model 30 with the cuffs 38 removed showing the base 32, connector 34 and cuff holder 36.

The base 32 of the cuff model 30 is a platform that serves as a bottom support for the rest of the model 30 and it is sized and configured such that the model does not tip over. The platform is made of any material such as metal or plastic. The base 32 is of sufficient heft to maintain the stability of the model 30 in the upright position while being manipulated by a user. The model 30 is sized and configured to be placed into the body cavity 12 of the surgical trainer 10 in the location of the model receiving area 24. The underside of the base 32 is provided with means to affix the cuff model 30 inside the surgical trainer 10. Such means to affix the cuff model 30 inside the trainer 10 include but are not limited to adhesive, suction cup, snap-fit, magnet, and a hook-and-loop type fastener material attached to the bottom surface of the base 32 and configured to connect with a complementary hook-and-loop type fastener material or adhesive attached to the base 18 of the surgical trainer 30.

Figure 4:
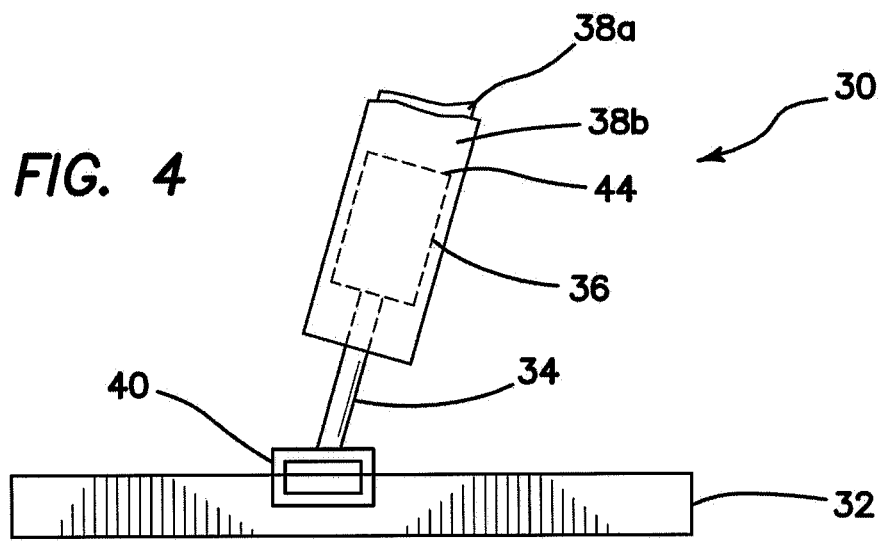
FIG. 4 illustrates a side view of a cuff model according to the present invention.

Still referencing FIGS. 2 and 3, connected to the base 32 of the cuff model 30 is a connector 34. The connector 34 is an elongate arm that separates the cuff holder 36 from the base 32. At a first end, the connector 34 is connected to the base 32 such that it extends vertically upwardly from the base. At a second end of the connector 34, the connector 34 is connected to the cuff holder 36. The connector 34 is a flexible gooseneck such that the position of the cuff holder 36 can be adjusted with the position being maintained by the gooseneck connector 34 following the adjustment. In one variation, the connector 34 is flexible and in another variation the connector 34 is rigid. In yet another variation that is shown in FIG. 4, a rigid connector 34 is connected to the base 32 via a ball joint or swivel bearing 40 such that the rigid connector 34 is movable in manner that permits adjustment yet maintains the cuff holder 36 in the new position following the adjustment. The connector 34 may be rotatable with respect to the base 32. Also, the connector 34 may be flimsy such that it does not hold an adjusted position but has to be maintained in the desired position by the user. Of course, the connector may be connected directly to the base 18 of the trainer 10.

Figure 5:
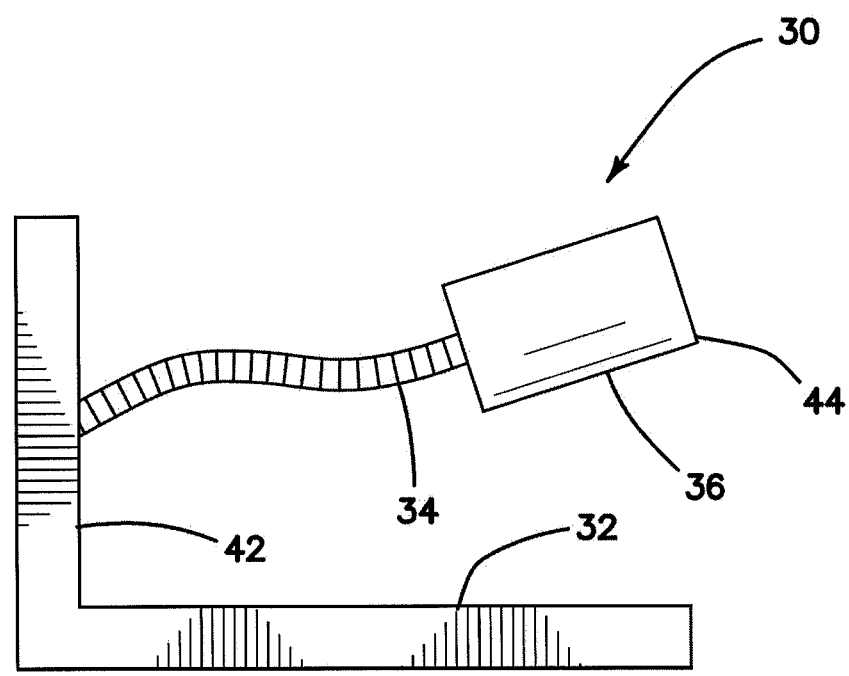
FIG. 5 illustrates a side view of a cuff model according to the present invention.

Another variation of the cuff model 30 is shown in FIG. 5 in which the base 32 includes a vertical portion 42. From the upstanding vertical portion 42, the connector 34 extends substantially laterally as shown in FIG. 5. The connector 34 is a flexible gooseneck-type connector 32 or a rigid connector 34 that supports the cuff holder 36. FIG. 5 shows the cuff holder 36 without one or more cuffs 38. In this variation, the connector 34 may also be rigid or flexible and capable of maintaining its position relative to the base or not. Also, a swivel bearing may be employed to connect the connector to the vertical portion 42.

Figure 6:
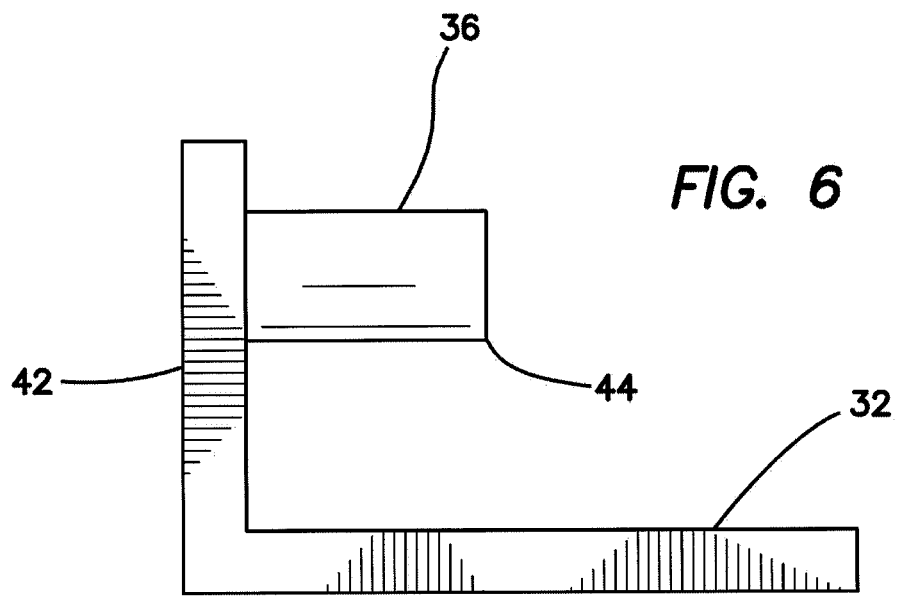
FIG. 6 illustrates a side view of a cuff model according to the present invention.

Turning now to FIG. 6, there is shown another variation in which the base 32 includes a vertical portion 42 extending upwardly. From the upstanding vertical portion 42, the cuff holder 36 is attached directly to the base 32. In this variation, there is no connector 34 that would impart flexibility or movability to the cuff holder 36. The cuff holder 34 is attached with adhesive or other fastener means directly to the base 32. In another variation, as shown in FIG. 6, the connector is an elongate pin or the like onto which the cuff holder 36 is mounted in a fixed or movable relationship in which the cuff holder 36 angulates, rotates or moves relative to the base 32. Of course, the cuff holder 36 can be attached to the horizontal portion of the base 32 without the connector 34. Without the connector 34, the cuff holder 36 may be connected to the base 32 at an angle with respect to the base 32.

The cuff holder 36 is a structure configured to hold the cuff 38 in a desired configuration. The cuff holder 36 is connected to the connector 34 or directly to the base 32 as described above. The cuff holder 36 serves as a mount for one or more cuffs 38 to be placed over the cuff holder 36. In one variation, the cuff holder 36 is cylindrical in shape and is made of any suitable material such as plastic or metal in solid or hollow construction. The proximal end of the cuff holder 36 that connects to the connector 34 may include connecting means or socket for receiving and attaching to the connector 34. The cuff holder 36 may attach to the connector 34 such that the cuff holder 36 rotates, angulates, twists or moves with respect to the connector 34. In one variation, the cuff holder 36 is not circular in cross-section but has an elliptical cross-section. In one variation, the major axis of the elliptical cross-section of the cuff holder 36 is approximately 1.75 inches and the minor axis is approximately 1.0 inch. In another variation, the major axis of the elliptical cross-section of the cuff holder 36 is approximately 2.25 inches and the minor axis is approximately 1.5 inches. The cuff holder 36 can have any cross-sectional shape including any closed curve or polygonal shape depending upon the surgical skill to be practiced and the purpose of the tissue simulation. The cuff holder 36 is approximately 1.5 inches long. Furthermore, the cuff holder 36 is removable from the base or connector 34 and interchangeable with another cuff holder 36 having a different length or cross-sectional shape or size. The cuff holder 36 may be connected by any removable means such as snap-fit, friction-fit, or threaded onto the connector 34.

Figure 7:
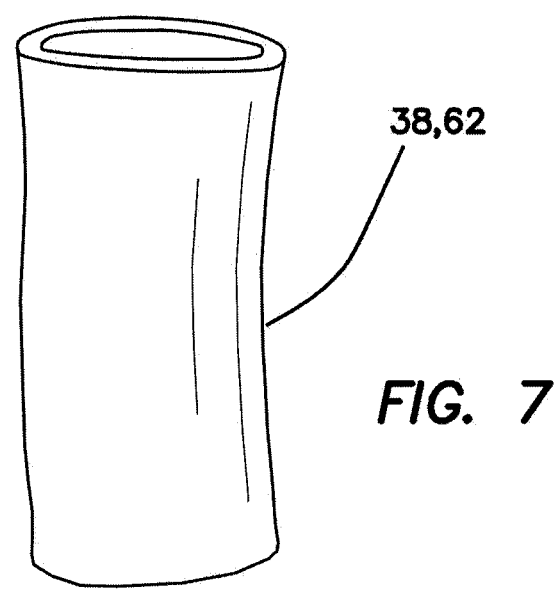
FIG. 7 illustrates a side perspective view of a single cuff according to the present invention.

Turning now to FIG. 7, a typical cuff or sleeve 38 of the present invention is shown. The cuff 38 has a tubular form having a central lumen interconnecting an open proximal end and an open distal end. At least a portion of the distal end of the cuff 38 is resilient and compressible such that the perimeter of the distal end can be pressed together or drawn into juxtaposition by the user employing clamps or sutures or staples or simply by pressing the end to close the lumen and distal opening. The material of the cuff 38 is flexible and preferably made of polymeric material. The cuff may include a four-way stretch, porous fabric material such as nylon with a silicone over mold formed into a hollow cylindrical, tubular shape. The thickness of the cuff 38 is approximately 1-5 mm and the cuff 38 is approximately 2-4 inches in length and could be longer such as up to 6 inches. Generally, the cuff 38 is longer in length than the cuff holder 36 such that at least a portion of the cuff 38 extends beyond the free distal end 44 of the cuff holder 36. Since the material of the cuff 38 is stretchable, it is sized to stretch over the cuff holder 36. Hence, the diameter of the cuff 38 closely matches the diameter of the cuff holder 36 with the cuff holder 36 being the same or slightly larger in diameter than the diameter of the cuff 38 such that the cuff 38 is placed in tension when stretched over the cuff holder 38 and thereby held removably connected to the cuff holder 38. A cuff 38 having an elliptical cross-section is also within the scope of the present invention. The major axis of the elliptical cross-section of the cuff 38 is approximately 1.75 inches and the minor axis is approximately 1.0 inch. In another variation, the major axis of the elliptical cross-section of the cuff 38 is approximately 2.25 inches and the minor axis is approximately 1.5 inches. A cuff 38 having an elliptical cross-section may be placed over a cuff holder 36 that has a circular cross-section or an elliptical cross-section. The silicone over mold provides a realistic tissue feel and the embedded fabric material of the cuff prevents tearing of the material which is especially important as the user practices pulling sutures through the cuff 38. The cuff 38 may be made of any polymer, including silicone or a thermoplastic elastomer, styrenic block copolymer such as KRATON® or hydrogel. The cuff 38 is dyed any color, typically white or pink, to mimic real tissue. Where two cuffs 38 are employed for practicing, a first cuff 38a is selected as white and placed over the cuff holder 36 and the second cuff 38b is red or pink in color and placed over the first cuff 38a such that the first cuff 38a is inside the second cuff 38b. The use of two colors mimics certain real tissues of the human body and also allows for contrast and distinction between the two cuff layers. The outside layer being red or pink does not get washed out by light when viewed via a laparoscopic camera on a monitor. Since it is red or pink it does not reflect the light while viewed under the scope as a white layer would. Any color can be employed for the two layers so long as contrast is created between the layers when viewed via a monitor. Hence, one layer is a light colored layer, preferably the inner cuff layer and the outer cuff layer is preferably made of a darker color. Contrasting layers is not required. Also, instead of using two cuffs 38a and 38b, a single cuff 38 can be formed to mimic a two cuffs, one placed inside the other, and the single cuff can be dyed with a gradient of color from dark to light going from outside to the inside of the cuff 38. The distal end of one or more cuffs 38a, 38b may include an uneven edge for increased difficulty in suturing the ends together requiring the practitioner to vary the suture lengths, pull and stretch the cuffs accordingly. The uneven distal ends of the cuffs 38 may include scallops that extend inwardly from the distal end of the cuff to create a wavy pattern at the distal end. When two cuffs 38a, 38b are employed, one on top of the other, their respective distal ends are uneven also with respect to each other. For example, one cuff may have a straight edge and the other cuff may have an uneven distal edge or both cuffs may have uneven distal edges. For a simple suturing exercise, the distal ends are even.

In use, a single cuff 38 that is placed in tension and stretched over the cuff holder 36. The cuff is moved towards the connector 34 until a desirable amount or length of cuff 38 material overhangs or extends beyond the distal or free end 44 of the cuff holder 36. The cuff 38 extending beyond the free end 44 of the cuff holder 36 is shown in FIGS. 2 and 4. The user practices closing the open end of the cylindrical cuff 38 that overhangs the distal end 44 of the cuff holder 36 with sutures or staples. The overhanging portion of the cuff 38 advantageously mimics certain real tissue structures such as a resected bowel and the vaginal opening and allows the user to practice whatever suturing technique they would like to practice in the laparoscopic or endoscopic minimally invasive procedure in which the cuff model 30 is hidden from direct visualization by the surgeon having been placed inside the surgical trainer 10. The cuff 38 may be any size and diameter depending upon whether the simulation is for a large intestine, small intestine, colon, vaginal cuff, or vascular structure.

For example, a surgeon can practice the suturing necessary to be performed following a laparoscopic hysterectomy. Laparoscopic gynecological surgeons perform total laparoscopic hysterectomies in which the uterus is removed requiring closure of the vaginal vault. The present cuff model 30, and in particular, the overhang portion of the cuff 38, mimics the entry to the vaginal vault that needs to be closed by suturing following a hysterectomy. The surgeon can thus use the model to practice suturing in this special procedure.

Especially realistic is the use of two cylindrical cuffs 38a and 38b to mimic the vaginal vault which comprises of two tissue layers, an inner layer and an outer layer which are sutured closed. The inner cuff 38a may represent a mucosa layer and the outer cuff 38b may represent the fascia or peritoneum for practicing surgical skills. In one variation, two cuffs 38a and 38b are placed over the cuff holder 36 in tension. In one variation, a first cuff 38a having a white color is stretched slightly and pulled onto and over the cuff holder 36 leaving an overhang portion described above. Then a second cuff 38b that is red or pink in color is place over the first cuff 38a by stretching it slightly and pulling it over the first cuff 38 and onto the cuff holder 36. Alternatively, a first white cuff 38a is placed inside a second red or pink cuff 38b and then both are simultaneously stretched slightly and then pulled over the cuff holder 36 simultaneously. The stretching of the cuffs 38a and 38b over the cuff holder 36 is what holds the cuff layer 38a and 38b in place and movably connected to the cuff holder 36. In another variation, the two cuffs 38a and 38b are glued together with or without a setback at the distal end of the top layer 38b. The adhesive is applied proximally from the distal ends such that the two layers 38a, 38b are separable from each other at the distal end. The overhang portion includes an inner cuff 38a and an outer cuff 38b and their distal ends extending beyond the distal end 44 of the cuff holder 36 by a distance of approximately 0.25 inches to 1.0 inches. The length of the overhang portion may vary and is selectable by the user by moving the cuff 38 along the cuff holder 36 to adjust the length of the overhang. The cuff holder 36 is configured to maintain the overhang portion of a cuff 38 of substantially the same cross-sectional shape as the cuff holder 36 in a substantially open shape. For example, a cuff 38 having a circular cross-section when mounted on a cuff holder 38 having a circular cross-section will have an overhang portion that retains an opening that is substantially circular at the distal end. If a more elliptically-shaped overhang portion is desired an elliptically shaped cuff can be mounted on a cuff holder having an elliptical cross-section. The second or outer cuff 38b is placed over the first cuff 38a such that the distal end of the second or outer cuff 38b is set back approximately ⅓ cm from the distal end of the first or inner cuff 38a as shown in FIGS. 2 and 4. An example of a two cuff construct includes a tubular first cuff 38a having a substantially elliptical cross-section with a major inner axis dimension of approximately 1.75 inches and a minor inner axis dimension of approximately 0.40 inches with a thickness of approximately 0.125 inches and approximately 3.0 inches long. The second or outer cuff 38b is also tubular having an elliptical cross-section and a thickness of approximately 0.05-0.08 inches and an overall length of approximately 2.80 inches. The outer cuff 38b has a major inner axis of approximately 2.0 inches and a minor inner axis dimension of approximately 0.66 inches. The distal end of the first cuff 38a extends approximately 0.3-0.5 cm beyond the distal end of the second cuff 38b. The shorter length of the second cuff 38b forces the practitioner to pull the distal end of the second cuff 38b into alignment with the distal end of the first cuff 38a for suturing both ends together allowing the user to practice keeping the outer layer in tension while placing the suture. Also, the outer layer 38b is thinner than the inner layer 38b forcing the user to regulate the tension appropriately so that the suture does not pull through the cuff material. Hence, it is advantageous to have two layers that are not of the same thickness.

Other than color, diameter and length, the inner and outer cuff layers 38a and 38b are substantially identical made with the same materials or alternatively of different materials. For example, one or more of the layers may omit the mesh support. Also, the thicknesses of the layers may be the same (approximately 1/16 inches thick). If cuffs 38 of circular cross-sections are employed, the inner or first cuff 38a has a diameter of approximately 1.0 inch and the outer or second cuff 38b has a diameter of approximately 1.125 inches. The cuff holder 36 is approximately 1.125 inches in diameter which is the same diameter of the outer or second cuff 38b. With at least one cuff 38 on the cuff holder 36, the cuff holder 36 can be articulated using the flexible connector 34 to position the proximal open end of the cuffs 38 that suits the clinician. Hence, the clinician can practice manipulating the position of the cuff holder 36 to adequately suit his needs. Then, the user sutures or staples the cuff closed. The position of the cuff can be manipulated during the closure by the clinician or assistant in order to obtain the optimal position for the surgeon to perform suturing. Hence, the articulating connector arm 34 allows for different positions or adjustments of the cuff 38.

With the overhang portion available for practicing suturing, the user can practice making individual stitches each closed by an intracorporeal or extracorporeal knot (interrupted suture) or a running stitch which has a knot at the beginning and end but no knots in the middle. Additionally, the user can practice using a barbed suture that does not require knots of any type and runs the length of the open end of the overhanging cuff. Most often the user will close both inner and outer cuff layers 38a and 38b at the same time or they may practice closing the first or inner cuff 38a layer first and then closing the second or outer cuff 38b layer. After the stitches are completed, the surgeon can also practice performing a leak test to see if the suture cuff has been adequately closed by pouring water into the inner cuff to see if the water holds inside the cuff. In the leak test, after the layers are sutured closed, the user would remove the cuff from the cuff-holder and pour water in the open end of the cuff to see if the sutured end leaks. The water should remain contained within the cuff. If leaking is observed the suturing requires improvement. The same leak test may be performed after the cuff is stapled.

Following a closure of the at least one cuff 38 with sutures or staples, the user can cut off the end that was sutured or stapled removing it from the remainder of the at least one cuff and if necessary slide the at least one cuff 38 towards the free end 44 of the cuff holder 36 to create another overhang portion or selectably increase or adjust the length of the one or more overhang portions to practice suturing again. This process can be repeated until there is insufficient cuff 38 to remain stretched onto the cuff holder 36 at which point a new cuff 38 or cuffs 38 can be placed over the cuff holder 36 for further practice. Hence, the cuff 38 is designed as a consumable component which is approximately 3 inches long and may be longer which allows for multiple uses before needing a replacement. The user sutures the cuff closed. Then, the distal portion of the cuff 38 is cut off so that the remaining length of the cuff can be used several more times before it needs to be replaced. Thereby, the cuff model 30 advantageously isolates the step of suturing a cylindrical opening, in particular, the laparoscopic suturing of the vaginal cuff in a representative model for the purpose of repeated practice.

Figure 8:
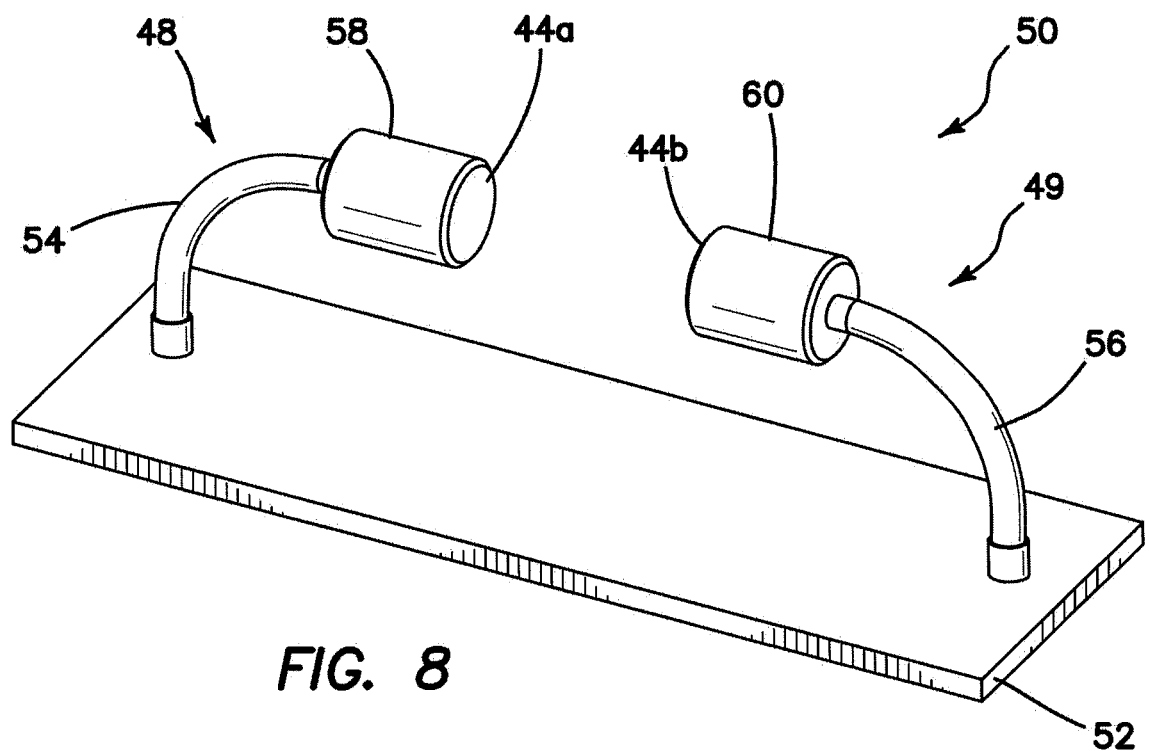
FIG. 8 illustrates a top perspective view of a cuff model without one or more cuffs according to the present invention.

Turning now to FIG. 8, there is shown another variation of the cuff model 50 in which two cuff models 48, 49 each of the like described above are positioned substantially opposite from each other. The cuff model 50 is configured to be placed in the surgical training device 10 described above and shown in FIG. 1 or other surgical trainer similar to the one described above. The cuff model 50 includes two cuff models 48, 49 connected to a base 52 in substantially opposite relation to each other. The first cuff model 48 includes a first connector 54 connected to the base 52 at one end and to a first cuff holder 58 at the other end. The second cuff model 49 includes a second connector 56 connected to the base 52 at one end and to a second cuff holder 60 at the other end. At least one cuff 62 is placed on each cuff holder 58, 60 as shown in FIG. 9 which illustrates cuffs 62a and 62b placed on the first and second cuff holders 58, 60, respectively.

The base 52 of the cuff model 50 is a platform that serves as a bottom support for the both cuff models 48, 49 and it is sized and configured such that the model does not tip over. The platform is made of any material such as metal or plastic. The base 52 is of sufficient heft to maintain the stability of the model 50 in the upright position while being manipulated by a user. The model 50 is sized and configured to be placed into the body cavity 12 of the surgical trainer 10 in the location of the model receiving area 24. The underside of the base 52 is provided with means to affix the cuff model 50 inside the surgical trainer 10. Such means to affix the cuff model 50 inside the trainer 10 include but are not limited to adhesive, suction cup, magnet, snap-fit, and a hook-and-loop type fastener material attached to the bottom surface of the base 52 and configured to connect with a complementary hook-and-loop type fastener material attached to the base 18 of the surgical trainer 10.

Figure 9:
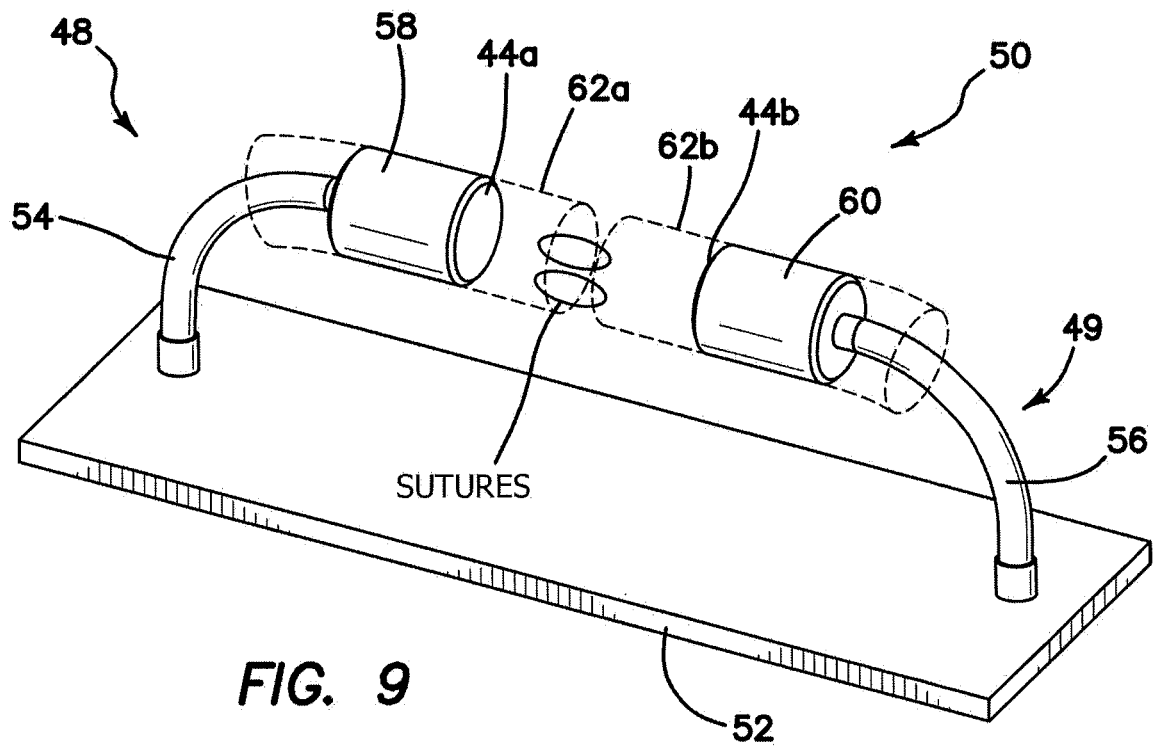
FIG. 9 illustrates a top perspective, partially transparent view of a cuff model with two cuffs according to the present invention.

Still referencing FIGS. 8 and 9, connected to the base 52 of the cuff model 50 is a first connector 54 and a second connector 56 of the like described above with respect to connector 34. The connectors 54, 56 are elongate arms that separate each cuff holder 58, 60, respectively, from the base 52. At their first ends, the connectors 34 are connected to the base 52 such that each extends vertically upwardly away from the base 52. At their second ends, each connector 54, 56 is connected to the cuff holders 58, 60. Each connector 54, 56 is a flexible gooseneck arm such that the position of the cuff holders 58, 60 can be adjusted with the position being maintained by the gooseneck connectors 54, 60 following the adjustment. In one variation, at least one of the connectors 54, 56 is flexible and in another variation the connectors 54, 56 are both rigid. In yet another variation, rigid connectors 54, 56 are connected to the base 52 via a ball joint or swivel bearing such as described and shown in FIG. 4 such that the rigid connectors 54, 56 are movable in manner that permits adjustment yet maintains the cuff holders 58, 60 in the new position following the adjustment.

In other variations of the cuff model 50, at least one of the connectors 54, 56 is attached to one or more vertical portions of the base 52 as shown in FIG. 5 such that from the upstanding vertical portion the connectors 54, 56 extend substantially laterally toward each other and in opposition from each other. The cuff holders 58, 60 may be connected directly to the base 52 and in another variation, one or more of the cuff holders 58, 60 are connected directly the base 18 of the trainer 10 and yet in another variation no cuff holders 58, 60 or connectors 54, 56 are employed and the cuffs are connected to base 18 of the trainer 10 with clips 26 connected to the base. The connectors 54, 56 are flexible gooseneck-type connectors or rigid connectors that support cuff holders 58, 60, respectively. FIG. 8 shows cuff holders 58, 60 without one or more cuffs 62.

In another variation of the cuff model 50, the base 52 includes two opposed vertical portions extending upwardly of the like shown in FIG. 6. From the upstanding vertical portion, the cuff holders 36 are attached directly to the vertical portions and extend laterally toward each other and into opposition from each other. The cuff holders 58, 60 are attached with adhesive or other fastener means directly to the base 52. In another variation of the cuff model 50, the connectors 54, 56 are elongate pins onto which the cuff holders 58, 60 are mounted in a movable or fixed relationship. Of course, the cuff holders 58, 60 can be attached to the horizontal portion of the base 52 without the connectors 54, 56.

The cuff holders 58, 60 are each configured to hold at least one cuff or sleeve 62 in a desired configuration. The cuff holder 58 is connected to the connector 54 or directly to the base 52 as described above. Cuff holder 60 is connected to connector 56 or directly to the base 52. The cuff holders 58, 60 serve as a mounts for one or more cuffs 62 to be placed on each cuff holder 58, 60. In one variation, the cuff holders 58, 60 are cylindrical in shape and are made of any suitable material such as plastic or metal in solid or hollow construction. The end of the cuff holder that connects to the connector may include connecting means or socket for receiving and attaching to the connector. In one variation, the cuff holder is not circular in cross-section but has an elliptical cross-section. The cuff holders can have any cross-sectional shape including any closed curve or polygonal shape. Each of the cuff holders 58, 60 are approximately 1.5 inches long.

The typical cuff 62 used for cuff model 50 is the same as used for cuff model 30 and shown and described in FIG. 7. The cuff material includes a four-way stretch, porous fabric material such as nylon or other mesh with a silicone over mold formed into a hollow cylindrical, tubular shape. The thickness of the cuff 62 is approximately 1-5 mm and the cuff 62 is approximately 3-4 inches in length and could be longer such as up to 6 inches. To simulate the thickness of an intestine, the cuff is larger approximately ⅛ inches thick. The cuff 62 is generally longer in length than the cuff holders 58, 60 such that at least a portion of the cuffs 62a, 62b extends beyond the free ends 44a, 44b of the cuff holders 58, 60, respectively, as seen in FIG. 9. Since the material of the cuffs 62a, 62b is stretchable, it is sized to stretch over cuff holders 58, 60, respectively. Hence, the diameter of the cuffs 62a, 62b closely match the diameter of the cuff holders 58, 60, respectively, with the cuff holders 58, 60 being the same or slightly larger in diameter than the diameter of the cuffs 62a, 62b, respectively, such that the cuffs 62a, 62b are placed in tension stretched over the cuff holders 58, 60. The silicone over mold provides a realistic tissue feel and the fabric material of the cuff prevents tearing of the material which is especially important as the user practices pulling sutures through the cuff 62. The cuff 62 is dyed any color, typically white or pink, to mimic real tissue. Where four cuffs 62 are employed for practicing particularized suturing, a first cuffs 62a and 62b are selected as white and placed over the cuff holders 58, 60, respectively, and the second cuffs 62c, 62d are selected as red or pink in color and placed over the first cuffs 62a, 62b, respectively. The use of two colors mimics certain real tissues of the human body and also allows for contrast and distinction between the two cuff layers. The outside layer being red or pink does not get washed out by light when viewed via a laparoscopic camera on a monitor. Since it is red or pink it does not reflect the light while viewed under the scope as a white layer would. Any realistic color can be employed for the two layers. Also, one layer may be formed to resemble a two-layer model and dyed with a gradient of color from darker at the outer surface to lighter color at the inner surface. The cuffs 62a, 62b, 62c, 62d may have a circular or elliptical cross-section and may be placed over cuff holders 58, 60 having circular or elliptical cross-sections.

In use, a single cuff 62a that is cylindrical in shape having a circular or elliptical cross-section is placed in tension, stretched over the first cuff holder 58 which may have a circular or elliptical cross-section. The cuff 62a is moved towards the connector 48 until a desirable amount of cuff 62a material overhangs or extends beyond the distal or free end 44a of the cuff holder 58. A second single cuff 62b that is cylindrical in shape is placed in tension, stretched over the second cuff holder 60. The cuff 62b is moved towards the connector 56 until a desirable amount of cuff 62b material overhangs or extends beyond the distal or free end 44b of the cuff holder 60. The user practices connecting the two overhanging portions of cylindrical cuff material whose distal open end are in juxtaposition or adjacent to each other. Connecting the two adjacent cylindrical overhanging portions of cuffs 62a and 62b is performed by repeatedly passing one or more suture 68 through one cuff 62a and the other cuff 62b to connect them together. The skill requires keeping one or more of the cuffs 62a, 62b under some tension so that ends can be sutured yet not with too much tension so that sutures do not tear through the cuffs. The overhang portion of the cuffs 62a, 62b advantageously mimics certain real tissue structures such as a portion of the bowel and allows the user to practice whatever suturing technique they would like to practice in the laparoscopic or endoscopic minimally invasive procedure in which the cuff model 50 is hidden from direct visualization by the surgeon having been placed inside the surgical trainer 10. Hence, this cuff model 50 includes two open cylindrical portions of cuff material that are held in proximity on respective cuff holders. The cuff holders can be adjusted to increase or decrease the difficulty in suturing the free ends together. For example, one connector can be twisted or directed to one side to offset one cuff holder from the opposed cuff holder or otherwise place the longitudinal axis of one cuff holder at an angle to the longitudinal axis of the other cuff holder to thereby offset or angulate the mounted cuffs from each other as described above with respect to FIGS. 8 and 9. At least one of the connectors 54, 56 with attached cuff holders 58, 60 may be removable from the base 52 for placement inside holes formed in the base 52 at different locations. The arrangement of holes in the base 52 allows for different angulations of the cuffs with respect to each other. Hence, the model 50 is ideal for practicing different types of anastomoses including end-to-end anastomosis as shown in FIG. 9 in which the ends of the cuffs are positioned approximately 1.5 inches apart and the ends of the holders are approximately 3.5 inches apart, side-to-side anastomosis in which the longitudinal axes of the cuffs 62a, 62b together with the cuff holders 58, 60 are oriented substantially parallel to each other by placing the connectors 54, 56 into adjacent holes in the base such that the cuffs are in juxtaposition, and side-to-end anastomosis in which the longitudinal axes of the cuffs 62, 62b together with the cuff holders 58, 60 are oriented substantially perpendicularly to each other by placing the connectors 54, 56 into appropriate holes in the base 52 such that the end of one cuff is in juxtaposition to the sidewall of the other cuff. Of course, two bases may be employed and moved into proper orientations for practicing different types of anastomoses. Also, the connectors may be flimsy goosenecks that require propping or constant adjustment to simulate real tissue that requires the user to support using an additional instrument or procedure.

Figure 10:
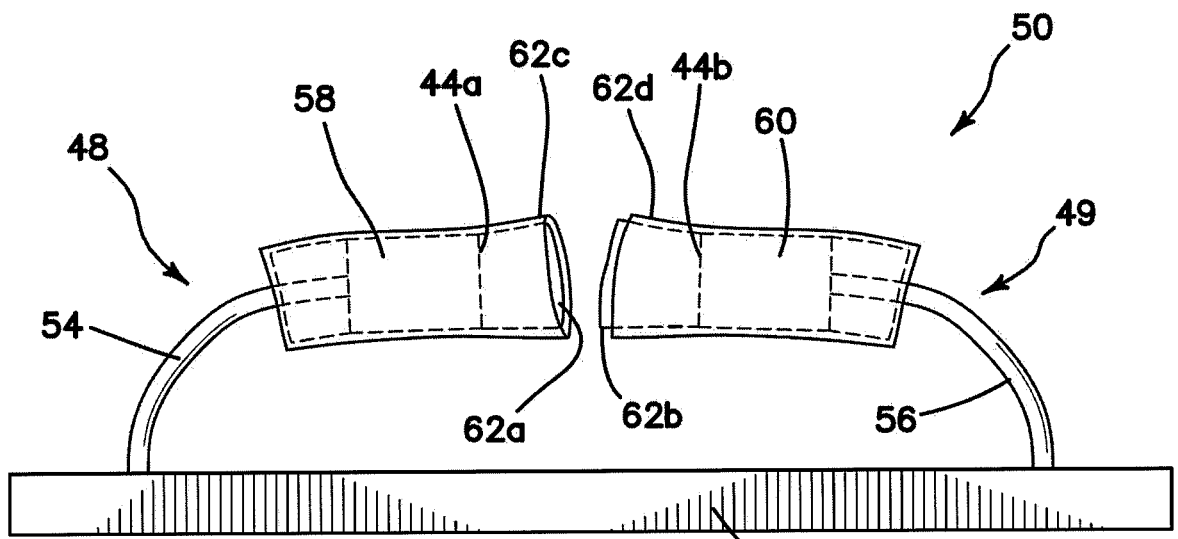
FIG. 10 illustrates a side, partially transparent view of a cuff model with four cuffs according to the present invention.

Turning now to FIG. 10, cuff model 50 can also be used with four cylindrical cuffs 62a, 62b, 62c, and 62d to create a construct having two layers of polymeric mesh material formed by cuffs 62a, 62c on one cuff holder 58 and two layers of polymeric mesh material formed by cuffs 62b, 62d on the other opposed cuff holder 60. In such a configuration, an inner layer and an outer layer are provided which are both sutured closed. In one variation, two cuffs 62a and 62c are placed over the cuff holder 58 in tension and two cuffs 62b and 62d are placed over the cuff holder 60 in tension. In one variation, first cuffs 62a, 62b are white in color and stretched slightly and pulled onto and over the cuff holders 58, 60, respectively, leaving oppositely disposed overhang portions distal to the cuff holder distal ends 44a, 44b, respectively. Then second cuffs 62c, 62d that are red or pink in color are placed over the first cuffs 62a, 62b, respectively, by stretching it slightly and pulling it over the first cuffs 62a, 62b and onto the cuff holders 58, 60, respectively. Alternatively, a first white cuff 62a is placed inside a second red or pink cuff 62c and then both are simultaneously stretched slightly and then pulled over the first cuff holder 58 simultaneously. The stretching of one or more cuffs over the cuff holder is what holds the one or more cuff layer in place and movably connected to the cuff holder. The overhang portion includes an inner cuff 62a and an outer cuff 62b on one cuff holder 58 and an overhang portion of an inner cuff 62b and an outer cuff 62d on the other cuff holder 60 with the distal overhanging portions that extend away from the free ends 44a, 44b of the cuff holders 58, 60 meeting in juxtaposition or adjacent to each other and in some variations separated by a distance across which suturing is practiced. The diameter of the inner and outer cuff layers is substantially identical and they are made with the same materials and approximately the same thickness (approximately ¹⁄₁₆ inches thick). In one variation, the outer cuff is slightly thinner than the inner cuff. The inner or first cuffs 62a, 62b have a diameter of approximately 1.0 inch and the outer or second cuffs 62c, 62d have a diameter of approximately 1.125 inches. The cuff holders 58, 60 are approximately 1.125 inches in diameter. With at least one cuff 62 on the cuff holders 58, 60, the cuff holders 58, 60 can be articulated using the flexible connector 54, 56 to position the distal open ends of the cuffs 62 in a manner that suits the clinician to practice the different types of anastomosis mentioned above. The diameter of the cuffs may vary from approximately 1.0 mm for vascular anastomosis and up to approximately 65 mm for gastric anastomosis with correspondingly sized cuff holders to hold the different cuffs. The cuff holders may interchangeable with the connectors and bases to fit different cuffs. The clinician can practice manipulating the position of the cuff holders 58, 60 to adequately suit his needs. Then, the user sutures the cuffs together. The position of the cuff can be manipulated during the closure by the clinician or assistant in order to obtain the optimal position for the surgeon to perform suturing. Hence, the articulating connector arms 54, 56 allow for different positions of the cuffs 62.

Following a connection of the at least one cuff 62 to at least one opposed cuff with sutures, the user can cut the sutured portion out removing it from the remainder of the remaining tube leaving two tubular pieces mounted on the cuff holders. The remaining tubular pieces can be moved by sliding on the cuffs towards the free ends 44a, 44b of the cuff holders to create overhang portions of sufficient length to practice suturing the two adjacent tubular cuffs together again. This process can be repeated until there is insufficient cuff remaining to be held stretched onto the cuff holders at which point new cuffs can be placed over the cuff holders for further practice. Hence, the cuffs 62 are designed as consumable components which are approximately 3 inches long and may be longer which allows for multiple uses before needing a replacement. A kit comprising of a number of cuffs may be sold to accompany an already purchased cuff holder, connector and base which may also be included in the kit. The user sutures the overhanging cuffs together. Then, the sutured portion of the cuff is cut out so that the remaining length of the cuff can be used several more times before it needs to be replaced. Thereby, the cuff model 50 advantageously isolates the step of suturing a tubular opening, in particular, the laparoscopic suturing of two tubular structures together in a representative model for the purpose of repeated practice.

Figure 11:
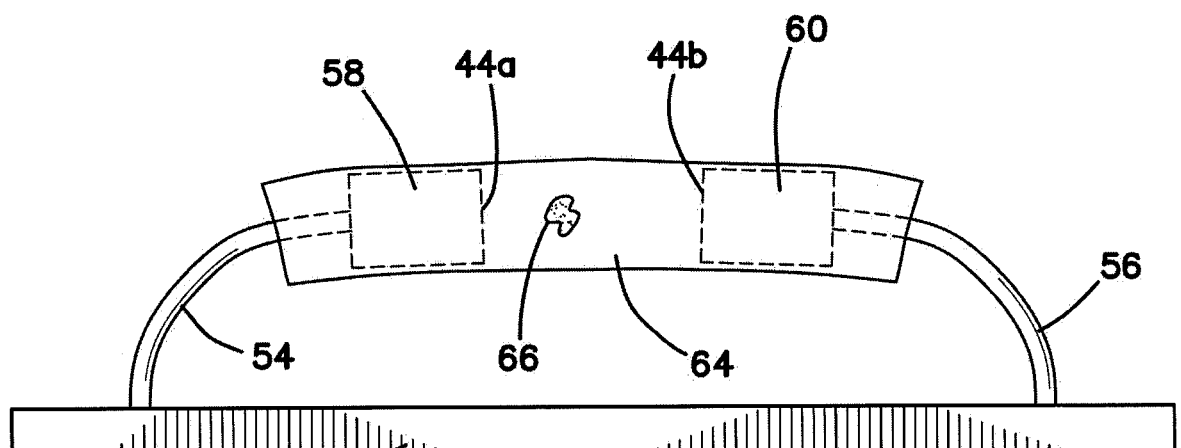
FIG. 11 illustrates a side, partially transparent view of a cuff model with one cuff according to the present invention.

Cuff model 50 is particularly useful for practicing anastomosis which is the connection of two structures. It refers to connections between blood vessels or between other tubular structures such as loops of intestine. An example of surgical anastomosis which the user can practice is when a segment of intestine is resected and the two remaining ends are sewn or stapled together (anastomosed), for example, in a procedure called Roux-en-Y anastomosis. In such a set up, the model would be employed with a singular cuff 64 that is mounted on both cuff holders 58, 60 and spans the distance between the cuff holders 58, 60 as shown in FIG. 11. The single cuff 64 can include a fake tumor 66 attached to the cuff 64 providing visual indication to the user of the location of the tumor by contrast coloring. The user can then resect that portion of the simulated intestine removing it from the cuff 64 and then manipulate the connectors 54, 56 to bring the remaining overhang portions closer together for anastomosis suturing or stapling the two remaining overhanging tubular portions together. In such a variation, the cuff 64 is approximately ⅛ inch thick and 6-12 inches in length.

In a variation of the model used for the practice of suturing a vaginal cuff after a hysterectomy, the model may further include adjunct simulated organs and tissues. For example, simulated adnexal tissues and peritoneum are provided with the model in addition to simulated uterosacral ligaments and bladder. These simulated tissues are made of silicone or other appropriate material.

While certain embodiments have been particularly shown and described with reference to exemplary embodiments thereof, it will be understood by those of ordinary skill in the art that various changes in form and details may be made therein without departing from the spirit and scope thereof as defined by the following claims.

We claim:
1. A surgical training device, comprising:
   a simulated vaginal cuff including:
      an elongate first simulated tissue made of flexible material and having an outer surface and an inner surface; the inner surface defining a first lumen interconnecting an opening at a distal end and an opening at a proximal end;
      an elongate second simulated tissue made of flexible material and having an outer surface and an inner surface; the inner surface defining a second lumen interconnecting with an opening at a distal end and an opening at a proximal end;
   wherein the first simulated tissue is disposed concentrically inside the second simulated tissue;
   a support configured to support the simulated vaginal cuff; the support including:
      a base having an upper surface and a lower surface;
      a holder having a proximal end and a distal end; and
      a connector having a proximal end and a distal end; the proximal end of the connector being connected to the upper surface of the base and extending upwardly from the base; and the distal end of the connector being connected to the proximal end of the holder;
      wherein the connector is an elongate arm;
   wherein the holder is inserted into the first lumen to connect the holder to the simulated vaginal cuff such that the distal end of the first simulated tissue is distal to the distal end of the holder by a length defining a first overhanging portion of the first simulated tissue; the first overhanging portion maintaining the opening at the distal end when connected to the holder and being compressible to close the distal opening; and
   wherein the second simulated tissue is connected to the holder such that the distal end of the second simulated tissue is distal to the distal end of the holder by a length defining a second overhanging portion of the second simulated tissue; the second overhanging portion maintaining the opening at the distal end when connected to the holder and being compressible to close the distal opening.

2. The surgical training device of claim 1 wherein the holder is configured to angulate with respect to the base.

3. The surgical training device of claim 1 wherein the simulated vaginal cuff is connected to the holder such that the simulated vaginal cuff is movable along the holder to vary the lengths of the first and second overhanging portions.

4. The surgical training device of claim 1 wherein the first simulated tissue and the second simulated tissue are connected to the holder such that the proximal openings of the first simulated tissue and second simulated tissue are stretched over the holder to locate at least a part of the holder inside the first lumen and second lumen.

5. The surgical training device of claim 1 wherein the first simulated tissue and second simulated tissue are tubular having an elliptical cross-section.

6. The surgical training device of claim 1 wherein the holder has an elliptical cross-section.

7. The surgical training device of claim 1 wherein the first simulated tissue includes a stretchable mesh material embedded in silicone.

8. The surgical training device of claim 1 wherein the second overhanging portion is shorter than the first overhanging portion.

9. The surgical training device of claim 1 further comprising a top cover connected to and spaced apart from a base to define a simulated abdominal cavity therebetween; the top cover including a penetrable tissue simulation region for accessing the simulated abdominal cavity;
   wherein the simulated vaginal cuff is located inside the cavity.

10. The surgical training device of claim 1 wherein the first simulated tissue and second simulated tissue are tubular having an elliptical cross-section and wherein the first holder has an elliptical cross-section.

\* \* \* \* \*